United States Patent
Yoon

(10) Patent No.: US 7,925,620 B1
(45) Date of Patent: Apr. 12, 2011

(54) CONTACT INFORMATION MANAGEMENT

(76) Inventor: Hyoungsoo Yoon, Sunnyvale, CA (US)

( * ) Notice: Subject to any disclaimer, the term of this patent is extended or adjusted under 35 U.S.C. 154(b) by 672 days.

(21) Appl. No.: 11/834,012

(22) Filed: Aug. 6, 2007

Related U.S. Application Data

(60) Provisional application No. 60/835,502, filed on Aug. 4, 2006, provisional application No. 60/827,211, filed on Sep. 27, 2006.

(51) Int. Cl.
*G06F 17/00* (2006.01)
(52) U.S. Cl. .................................. 707/609; 707/705
(58) Field of Classification Search ............ 707/999.2, 707/609, 705
See application file for complete search history.

(56) References Cited

U.S. PATENT DOCUMENTS

| | | |
|---|---|---|
| 4,945,218 A | 7/1990 | Talbott |
| 5,483,052 A | 1/1996 | Smith, III et al. |
| 5,493,105 A | 2/1996 | Desai |
| 5,745,900 A | 4/1998 | Burrows |
| 5,909,687 A | 6/1999 | Tapper |
| 5,918,227 A | 6/1999 | Polnerow et al. |
| 5,970,497 A | 10/1999 | Burrows |
| 5,995,105 A | 11/1999 | Reber et al. |
| 6,115,641 A | 9/2000 | Brown et al. |
| 6,148,289 A | 11/2000 | Virdy |
| 6,254,001 B1 | 7/2001 | Chan |
| 6,269,369 B1 | 7/2001 | Robertson |
| 6,374,259 B1 | 4/2002 | Celik |
| 6,412,689 B1 | 7/2002 | Horiguchi et al. |
| 6,438,546 B1 | 8/2002 | Higgins |
| 6,533,171 B1 | 3/2003 | Porter |
| 6,542,927 B2 | 4/2003 | Rhoads |
| 6,561,420 B1 | 5/2003 | Tsai et al. |
| 6,596,030 B2 | 7/2003 | Ball et al. |
| 6,609,653 B1 | 8/2003 | Lapstun et al. |
| 6,609,728 B1 | 8/2003 | Voerman et al. |

(Continued)

*Primary Examiner* — Charles Rones
*Assistant Examiner* — Belix M Ortiz

(57) ABSTRACT

A method, a system, and an apparatus for storing, retrieving, and sharing business or personal contact information on one or more servers on a computer network. A set of contact information (e.g., for a single individual) is given an identity, called contact entity, and it is managed through the system-wide unique identifier. Same contact entity is shared by one or more users with proper permission settings in the system. Contact entities can be searched and retrieved based on degrees of separations or other criteria. The social networking relationship may be established through use of certain electronic or physical tokens. In one embodiment, a business card is used to define a contact entity and/or it is used as (a medium for transmitting) a networking/connecting token.

20 Claims, 21 Drawing Sheets

U.S. PATENT DOCUMENTS

| | | |
|---|---|---|
| 6,616,052 B2 | 9/2003 | Tseng et al. |
| 6,644,545 B1 | 11/2003 | Lapstun et al. |
| 6,650,761 B1 | 11/2003 | Rodriguez et al. |
| 6,651,879 B2 | 11/2003 | Lapstun et al. |
| 6,654,768 B2 | 11/2003 | Celik |
| 6,658,423 B1 | 12/2003 | Pugh et al. |
| 6,679,420 B1 | 1/2004 | Lapstun et al. |
| 6,701,348 B2 | 3/2004 | Sommerer |
| 6,722,574 B2 | 4/2004 | Skantze et al. |
| 6,745,194 B2 | 6/2004 | Burrows |
| 6,783,060 B2 | 8/2004 | Marappan |
| 6,789,738 B2 | 9/2004 | Tsai et al. |
| 6,799,719 B2 | 10/2004 | Peng |
| 6,823,065 B1 | 11/2004 | Cook |
| 6,873,861 B2 | 3/2005 | Awada et al. |
| 6,883,000 B1 | 4/2005 | Gropper |
| 6,895,550 B2 | 5/2005 | Kanchirayappa et al. |
| 6,904,407 B2 | 6/2005 | Ritzel |
| 6,928,439 B2 | 8/2005 | Satoh |
| 6,934,634 B1 | 8/2005 | Ge |
| 6,956,942 B2 | 10/2005 | McKinzie et al. |
| 7,025,265 B2 | 4/2006 | Tsai et al. |
| 7,069,308 B2 | 6/2006 | Abrams |
| 2004/0148275 A1 | 7/2004 | Achlioptas |
| 2005/0251448 A1 | 11/2005 | Gropper |
| 2007/0106698 A1* | 5/2007 | Elliott et al. .................. 707/200 |

* cited by examiner

CONTACT INFORMATION MANAGEMENT

CROSS REFERENCE

The present application claims priority to co-pending U.S. Provisional Patent Application No. 60/835,502 filed on Aug. 4, 2006 and entitled "Address Book Server" and co-pending U.S. Provisional Patent Application No. 60/827,211 filed on Sep. 27, 2006 and entitled "Method and Apparatus for Document Identification and Management", each of which is incorporated herein by reference in its entirety; this application hereby claims the benefit of these provisional applications under 35 U.S.C. §119(e).

BACKGROUND OF THE INVENTION

1. Field of the Invention

The present invention generally relates to information storage and management system. More particularly, the present invention pertains to a method, a system, and an apparatus for storing, retrieving, and sharing contact information.

2. Description of the Related Art

Communication, or telecommunication, is one of the most important activities of people living in modern societies. There are various modes of communications between two or more parties: Telephones, postal mails, emails, instant messaging, etc. In order to establish a communication channel, one party should typically initiate communication, and the first step in doing so is finding the contact information of the desired party or parties, such as a telephone number, postal address, email address, instant messaging ID, etc., depending on the communication mode.

Traditionally, contact information has been exchanged (or, otherwise disseminated or uncovered) in various ways. One method involves the direct contact of the relevant parties. For example, one person can give the other person his or her phone number in a face-to-face meeting. Certain media may be used such as business cards. One mode of communication may be used to exchange other types of contact information. For example, person A may send to person B his telephone number through an email. Another prevalent method of discovering contact information involves a third party. For example, person A can get the contact information of person B through person C. More established methods include phone directories, organizational address books, etc. These methods have certain limitations. For example, the first method of exchanging contact information mentioned above can be utilized only in a limited context by its very nature. It also requires a certain amount of effort from each participant, for instance, to maintain and update the contact information. Furthermore, the effort is typically duplicated among many people. (For example, if one person's contact information changes, all people who have his or her contact information need to update it.) The second method of uncovering contact information mentioned above is probably more "scalable". However, it also requires certain amount of predisposed information to be able to retrieve the contact information. For example, one needs to know the name of the desired party in order to find the party's phone number (e.g., using white pages, etc.). Furthermore, it is not easy to retrieve the "optimal" (or, most relevant) information in the current design of the third-party based contact information storage, retrieval, and management systems. For example, if one wishes to find a "best" dentist in his or her area (in a certain subjective sense), yellow pages is not the best source of such information. Typically, people ask other people (e.g., friends, families, coworkers, other professionals such as doctors, etc.) for "referrals".

Many people maintain certain contact information (such as those frequently used, those of friends, those of business contacts, etc.), for example, in a personal address book, Rolodex, etc., or, by simply collecting business cards. Electronic personal information management (PIM) systems have also been widely used. For example, many mobile phones and personal digital assistants (PDAs) include PIM functionalities. Many people also manage their business and/or personal contact list on their personal computers, or on Web servers, etc. As stated earlier, this type of information management system involves redundant effort among many users and it incurs substantial amount of extra cost (to the system and the group of participants as a whole) due to duplicated efforts.

BRIEF SUMMARY OF EXEMPLARY EMBODIMENTS

Embodiments of the present invention provide a method, a system, and an apparatus for storing, retrieving, and managing business or personal contact information on a server in a computer network. A set of contact data such as a business phone number, residence address, etc. (e.g., for an individual or a business) are grouped into an object with a unique identity, which is referred to herein as a contact entity or a contact object. A contact entity may be created by a "principal", an actor who owns the relevant contact information. Or, a contact may be created by another party, an actor who uses the relevant contact information. An individual (or a business) may have more than one contact entity associated with him or her. Each contact entity on a system is identified by a unique identifier, and each user on the system is granted access to a certain set of contact entities.

According to an embodiment of the present invention, contact entities are classified into public types (e.g., those created by the principals) and private types (e.g., those created by different users), and public contact entities may be shared among users on a system. Each user may create his or her own personal contact list (much like a personal address book, Rolodex, etc.) by selecting (e.g., bookmarking, linking, etc.) public contact entities from system-wide contact entity database or by creating private contact entities (which may also be stored in a database on the system, etc.). In a certain embodiment, updating contact data in a public contact entity (e.g., by the principal) automatically updates the content viewed by other users. In a certain embodiment, the contact entities (or, contact data) are versioned and updating contact data creates a new version of the contact entity (or, contact data). Certain users may be automatically given access to the updated contact info depending on their permission levels.

In an embodiment of the present invention, a contact entity comprises at least two parts. The first part includes "public" contact data (e.g., a phone number, an email address, etc.) and it may be stored in a system-wide (e.g., common, shared, etc.) database. The second part, on the other hand, comprises "private" data associated with each user such as comments, memos, and so forth (e.g., a birthday of the principal of the contact entity), and it may be stored in a private data area (e.g., on a separate table, or on a separate row in a common table, etc.) associated with each user (e.g., a user that has the principal's contact info in his/her contact list, etc.). In a certain embodiment, a contact entity may further include another part(s) which can be shared among a group of users (e.g., shared comments, "ratings", etc.).

According to an embodiment of the present invention, permission values/access control levels may be associated with each public contact entity and/or each user. Only users with valid permission/access level for a given contact entity may be able to view the contact data and/or shared comments, etc. In at least one embodiment of the present invention, a certain subset of (public) contact entities on a system may be accessible by users who are not part of the system (e.g., a non-registered user). A certain embodiment may provide a service similar to a phone directory (e.g., white pages, yellow pages, etc.). In some cases, contact entities (or, contact data) are classified based on certain data (e.g., a part of the contact info such as the owner's residence city or the field of his occupation, etc.) or certain other attributes associated with the contact entities (or, contact data).

According to a certain embodiment of the present invention, the principal of a public contact entity may be able to set/change permission levels associated with the contact entity for different users (e.g., a "direct" permission, or a direct/first-order link), for different job types, and/or for different categories (e.g., industries), etc. In a certain embodiment, a degree of separation, or a certain closeness relationship, is defined between users on a system, for example, based on the direct permission relationships. Additional permissions/access controls may be set according to the degrees of separation. In some embodiments of the present invention, contact entities may be searched and retrieved based on various criteria including names, job titles, industries, etc. Contact entities may also be searched based on, or weighted by, degrees of separations. For example, a user may search for a plumber who is "closest" to him or her in terms of geographical locations and/or degrees of separations, etc.

According to an embodiment of the present invention, a business card (either paper-based or electronic such as vCard) is used to "define" a contact entity. In a certain case, a business card is directly linked to a contact entity and the contact data in the business card is substantially the same as the contact data included in the corresponding contact entity. In some embodiments, the image of a (paper) business card is stored with the contact entity. A business card may be used to create a contact entity (public or private). In a certain embodiment, a business card has a unique identifier associated with it and the identifier is used to identify the contact entity. The identifier may be printed on a (paper) business card as a human readable or machine readable form (e.g., a barcode, RFID, etc.). In a certain embodiment, the image (or, a part of it, etc.) of a business card is directly used as an "identifier". Copies of the same business cards are associated with a single unique contact entity. In some cases, business cards are associated with particular versions of a contact entity.

In accordance with at least one embodiment of the present invention, a business card may be used to establish a direct link relationship. For example, if person A has a business card of person B, person A automatically has a permission to view (the public part of) the contact entity associated with the business card. This may be achieved by person A inputting the person B's business card's identifier or other tokens (e.g., printed on the business card) into the system. In some cases, the relationship may always be established in a bilateral way. For example, user A adding user B in his contact list enables user B to add user A in her contact list. This mutual relationship may be automatically established in certain implementations. In some embodiments, electronic (or, virtual) business cards may be used for this purpose. In certain embodiments, certain electronic tokens (e.g., a URL with a certain private string, etc.) may also be used to establish the direct link relationship. In some embodiments, a business card (or other tokens) may be used only to access a particular version(s) of a contact entity.

Therefore, as summarized herein, the present invention provides, among other things, a method and an apparatus for storing, retrieving, managing, and sharing business or personal contact information on a networked computer system. These and other embodiments, features, aspects, and advantages of the present invention will be apparent from the accompanying drawings and from the detailed description and appended claims which follow.

BRIEF DESCRIPTION OF THE DRAWINGS

The novel features of the present invention are set forth in the appended claims. The invention itself, however, as well as preferred modes of use, and advantages thereof, will best be understood by reference to the following detailed description of illustrative embodiments when read in conjunction with the accompanying drawings, wherein:

DETAILED DESCRIPTION

Figure 1:
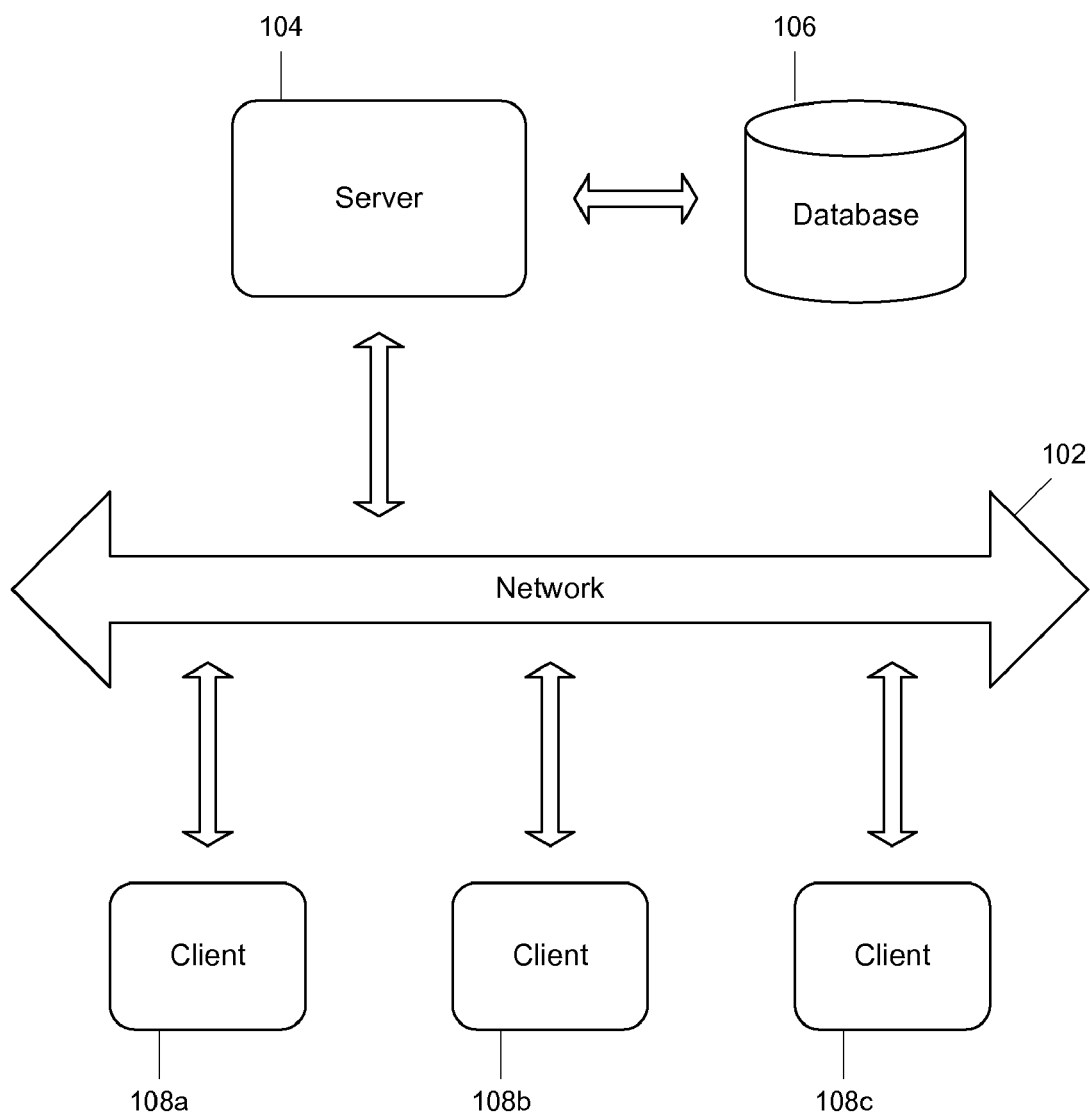
FIG. 1 illustrates an exemplary system according to an embodiment of the present invention.

The present invention will now be described more fully hereinafter with reference to the accompanying drawings, in which various exemplary embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Likewise, for purposes of explanation, numerous specific details are set forth in the following description in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention. Parts of the description may be presented using terminology commonly employed by those skilled in the art to convey the substance of their work to others skilled in the art. Also, parts of the description may be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

The invention may utilize a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks, enterprise-wide computer networks, and the global Internet. In addition, it should be understood that the programs, processes, methods, etc. described herein are not related to any particular computer or apparatus nor are they related or limited to any particular communication network architecture. Rather, various types of general-purpose machines may be used with program modules constructed in accordance with the teachings described herein. Similarly, it may prove advantageous to construct a specialized apparatus to perform the method operations described herein by way of dedicated computer systems in a specific network architecture with hard-wired logic or programs stored in nonvolatile memory such as ROM (read only memory).

Various methods will be described as multiple discrete operations in turn in a manner that is most helpful in understanding embodiments of the present invention. However, the order of the description should not be construed as to imply that these operations are necessarily to be performed in any particular order, in particular, in the order of the presentation. Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

The present invention provides, among other things, methods, systems, and apparatuses for storing, retrieving, managing, and sharing business or personal contact information on a network such as a LAN (local area network) or the Internet. A set of contact data such as a business phone number, residence address, email address, World Wide Web home page URL, etc. (e.g., for an individual or business) are grouped into an object, which is referred to herein as a contact entity or a contact object (or, simply contact data). Contact entities are then shared among users based on various preset rules (e.g., permission settings for contact entities, etc.). FIG. 1 illustrates an exemplary system according to an embodiment of the present invention. Various participants, 104 and 108, are connected through a network 102 such as the Internet or a cellular phone network. A server system 104 is coupled to (or, is connected to, contains, etc.) a database 106 where the contact information is stored. In a certain embodiment, a relational database is used. In a certain other embodiment, a flat or structured file on a file system is used. Other storage mechanism may also be used. In some cases, there may be more than one database (possibly of different types). The figure also shows at least three clients, 108a, 108b, and 108c, which are connected to the network 104. The clients can store, retrieve, and manage contact information (e.g., contact entities) through the server 104, as will be elaborated shortly. In some cases, the client may be an application running on a user's personal computer. In some cases, the client may be a Web browser accessing a particular (set of) Web page(s) running on a server (e.g., the server 104) on the network. According to an embodiment of the present invention, the system may involve more than one server (and associated databases, etc.) and the data may be distributed over multiple servers.

Figure 2:
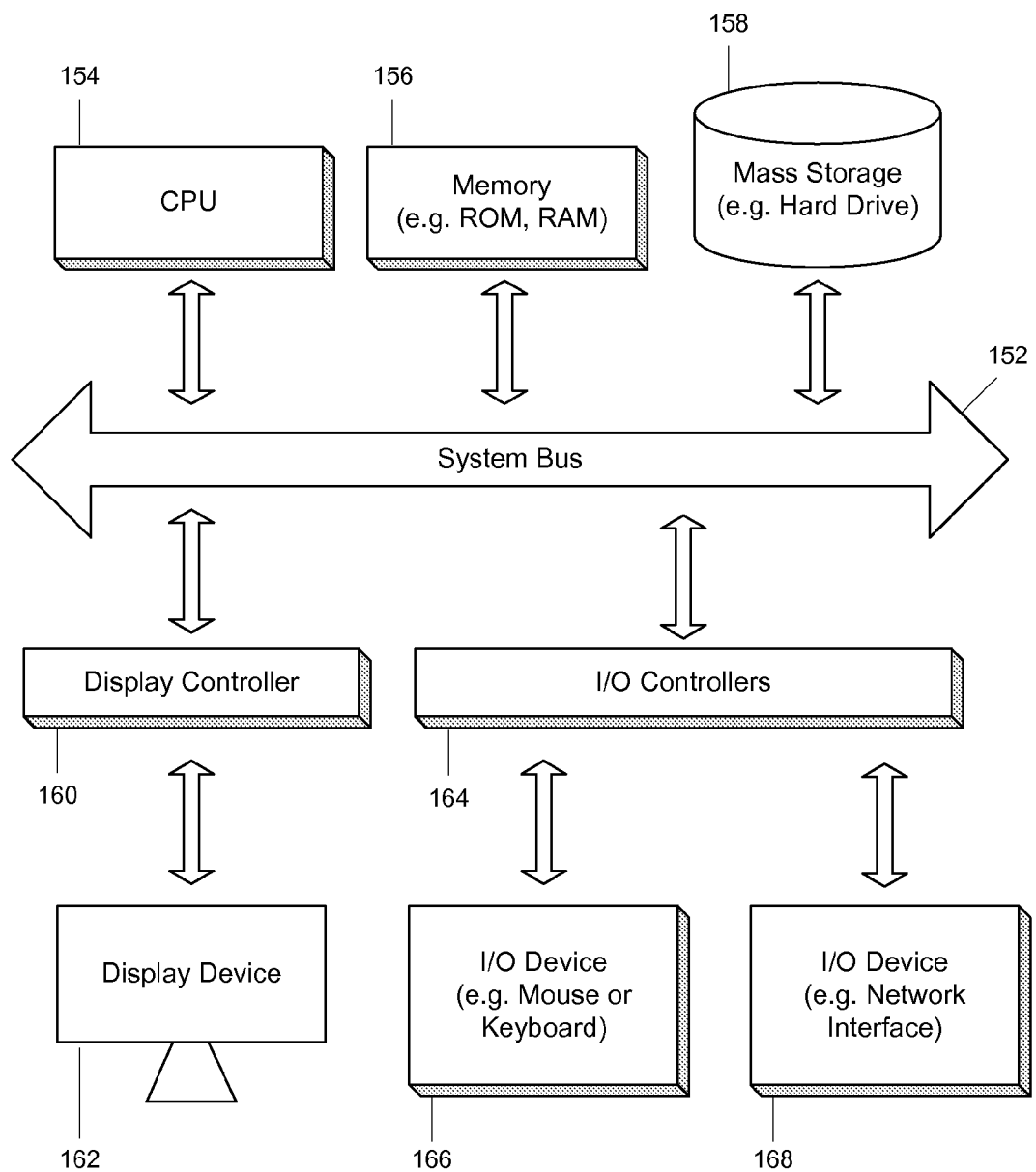
FIG. 2 illustrates an exemplary data processing system which may be used with various embodiments of the present invention.

FIG. 2 shows a block diagram illustrating various components of an exemplary data processing system such as a personal computer. This and other data processing systems may be used with various embodiments of the present invention. As will be appreciated by one of skill in the art, however, the present invention may be embodied as a method, data processing system or program product as well as an article of manufacture or an apparatus. Thus the scope of the invention should be determined by the appended claims and their legal equivalents, and not by the examples given. Note that while the block diagram of FIG. 2 illustrates various components of a data processing system, it is not intended to represent any particular architecture or manner of interconnecting the components. It will also be appreciated that personal computers, laptops, and network computers, and other data processing systems such as cellular telephones, personal digital assistants (PDAs), digital media players, etc. which have fewer components or perhaps more components may also be used with the present invention.

As shown in FIG. 2, the exemplary data processing system includes at least one bus 152 which is coupled to a microprocessor(s) 154 and a memory 156 such as a ROM (read only memory) or a volatile RAM (random access memory) and a non-volatile storage device(s) 158. The system bus 152 interconnects these various components together and also interconnects these components 154, 156, and 158 to a display controller(s) 160 and a display device(s) 162 such as LCD (liquid crystal display) screens and to peripheral devices such as input/output (I/O) devices 166 and 168 which may be mice, keyboards, input wheels, modems, network interfaces, printers and other devices which are well known in the art. Typically, the I/O devices 166 and 168 are coupled to the system through I/O controllers 164. The volatile RAM 156 is typically implemented as dynamic RAM (DRAM) which requires power continually in order to refresh or maintain the data in the memory. The mass storage 158 is typically a magnetic hard drive or a magnetic optical drive or an optical drive or a DVD ROM or other types of memory systems which maintain data (e.g. large amounts of data) even after power is removed from the system. Typically, the mass storage 158 will also be a random access memory although this is not required. While FIG. 2 shows that the mass storage 158 is a local device coupled directly to the rest of the components in the data processing system, it will be appreciated that the present invention may utilize a non-volatile memory which is remote from the system, such as a network storage device which is coupled to the data processing system through a network interface 168 such as a modem or Ethernet interface. The bus 152 may include one or more buses connected to each other through various bridges, controllers and/or adapters as is well known in the art. In one embodiment, the I/O controller 164 includes a USB (universal serial bus) adapter for controlling USB peripherals and an IEEE 1394 ("firewire") controller for IEEE 1394 compliant peripherals. The display controllers 160 may include additional processors such as GPUs (graphical processing units) and they may control one or more display devices 162.

According to an embodiment of the present invention, a contact entity, or contact data, is used to organize related contact information (e.g., for a single user) such as phone, fax numbers, email addresses, the user's company, his or her job title, etc. In certain embodiments, a contact entity may be standardized (e.g., in terms of the required/optional fields, etc.). A contact entity may be created by a "principal", a user whom the relevant contact information belongs to (or, by a person in charge of managing contact information for a group of people, e.g., a HR person in a company, etc.). Or, one may be created by another party, one of the users who are "consumers" of the relevant contact information. A user may have more than one contact entities associated with him or her. Each contact entity on a system is given a unique identifier, and each user on the system is granted access to a certain set of contact entities according to predefined/customizable rules. Each (registered) user may also be identified on the system by a certain unique username or an identifier (e.g., an alphanumeric string). In an embodiment of the present invention, contact entities are classified into at least two types: Public (e.g., those created by the principals) and private (e.g., those created by second parties). Contact entities of a public type may be shared among users on a system (e.g., if they are set to a proper permission level). In some embodiments of the present invention, only one copy of a public contact entity is stored in the system. Each user may create his or her own personal contact list (much like a personal address book, Rolodex, etc.) by selecting (e.g., bookmarking, linking, etc.) certain public contact entities from system-wide (e.g., common, shared, etc.) contact entity database (e.g., 106 of FIG. 1). In some implementations, a "reference" or link to the contact entity (e.g., rather than a separate copy of the contact entity) is included in the user's contact list. Users can also create their own private contact entities, which may be maintained in the server's database per user basis. In a certain embodiment, a public contact entity may be "copied" to create a personal contact entity for an individual user.

Figure 3A:
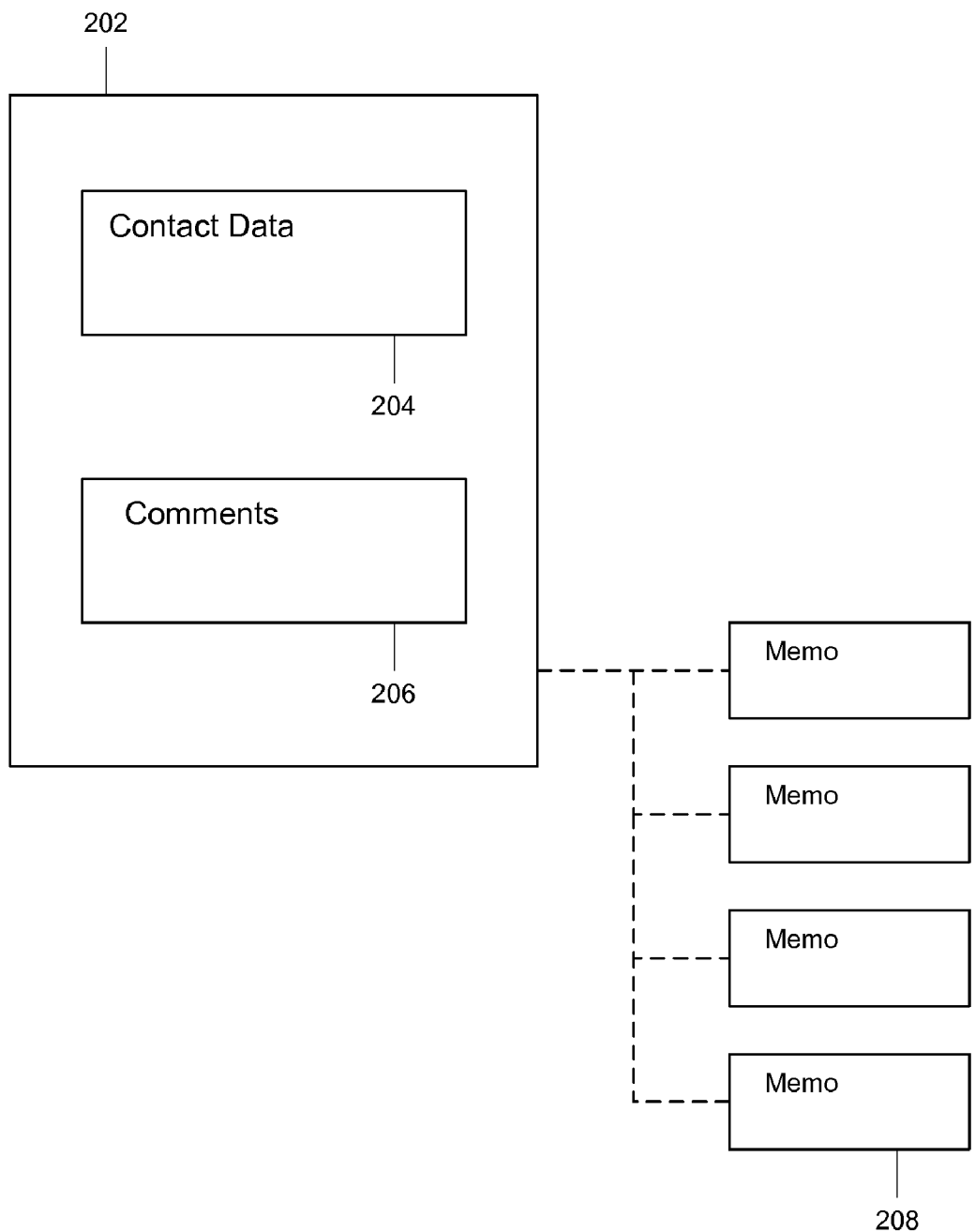
FIG. 3A is a schematic representation of a public contact entity according to an embodiment of the present invention.

According to an embodiment of the present invention, a contact entity comprises at least two parts. The first part includes contact data (e.g., a phone number, an email address, etc.) and it may be stored in a system-wide database. The second part, on the other hand, comprises private data associated with each user such as memos, comments, reminders, and so forth (e.g., a birthday of the principal of the contact entity), and it may be stored in a private table (or, on a separate row in a common table) associated with each user. In a certain embodiment, a contact entity may further include another part(s) which can be shared among a group of users (e.g., shared comments, "ratings", "recommendations", etc.). This is illustrated in FIG. 3A, which shows a schematic representation of a public contact entity 202 according to an embodiment of the present invention. As shown in the figure, the public contact entity 202 comprises a data segment 204 which includes contact information such as the name, phone numbers, and addresses. (This is further illustrated in FIG. 4.) The contact entity 202 also comprises (optional) "community data" 206, e.g., shared comments or ratings, etc., and it further comprises a set of private memos or notes 208. Each memo 208 is associated with a user on the system. As schematically represented in the figure, memos may be stored separately from the main content (e.g., 204 and 206), and they are linked to the contact entity 202 (as represented by broken lines in the figure). In some embodiments of the present invention, each (public) contact entity is identified by a unique identifier. In some cases, an alphanumeric string (possibly with certain punctuation symbols such as a period, a slash, a dash, etc.) is used as an identifier. In some cases, a URL (or, a URL format)

is used as an identifier (whether it points to a valid resource or not). In a certain embodiment, the URL points to a Web page that displays (a subset of) the contact information from the corresponding contact entity. In some cases, the Web page may be served by the same server that stores the contact information. According to an embodiment of the present invention, a contact entity (or, its identifier, etc.) may be sent to other users (users in the system or non-registered users). In a certain case, a copy of the contact entity data may be sent. In a certain other case, an identifier or a URL may be sent, which can be used to retrieve the pertinent data. In some embodiments, an electronic business card (e.g., vCard) may be created for transmission, or for data exchange.

Figure 3B:
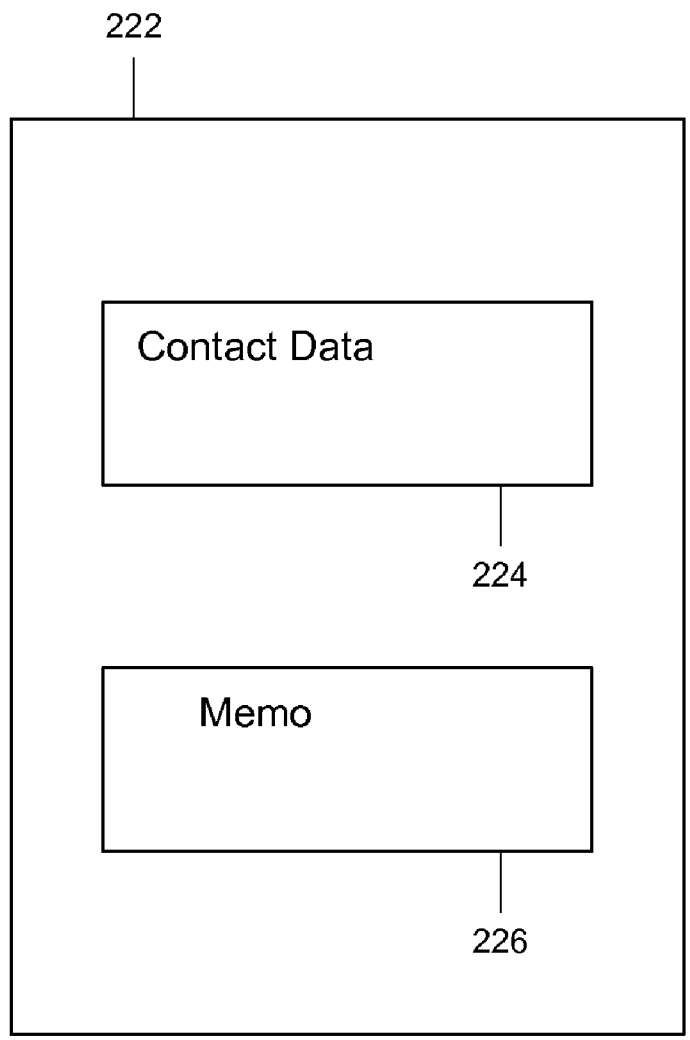
FIG. 3B is a schematic representation of a private contact entity according to an embodiment of the present invention.

FIG. 3B shows a schematic representation of another contact entity type, a private contact entity, according to an embodiment of the present invention. The rectangular box 222 schematically represents a private contact entity. It comprises contact data 224 and an optional (personal) memo 226. The memo field may be empty. In a certain embodiment, there may be more data associated with contact entity 222. Each private contact entity is associated with (or, belongs to) a (registered) user in a system, and hence the memo 226 is also associated with the particular user. This diagram should be compared to that of a public contact entity in FIG. 3A. As stated earlier, the public contact entity comprises shared/common data (including the contact data) as well as user-specific memos. The contact entity 222 belongs to a user on a system, whereas the (private) contact info 224 is for a person/business who is not necessarily a user on the system. In certain embodiments, private contact entities may be made viewable to other (selected) users on the system.

Figure 4:
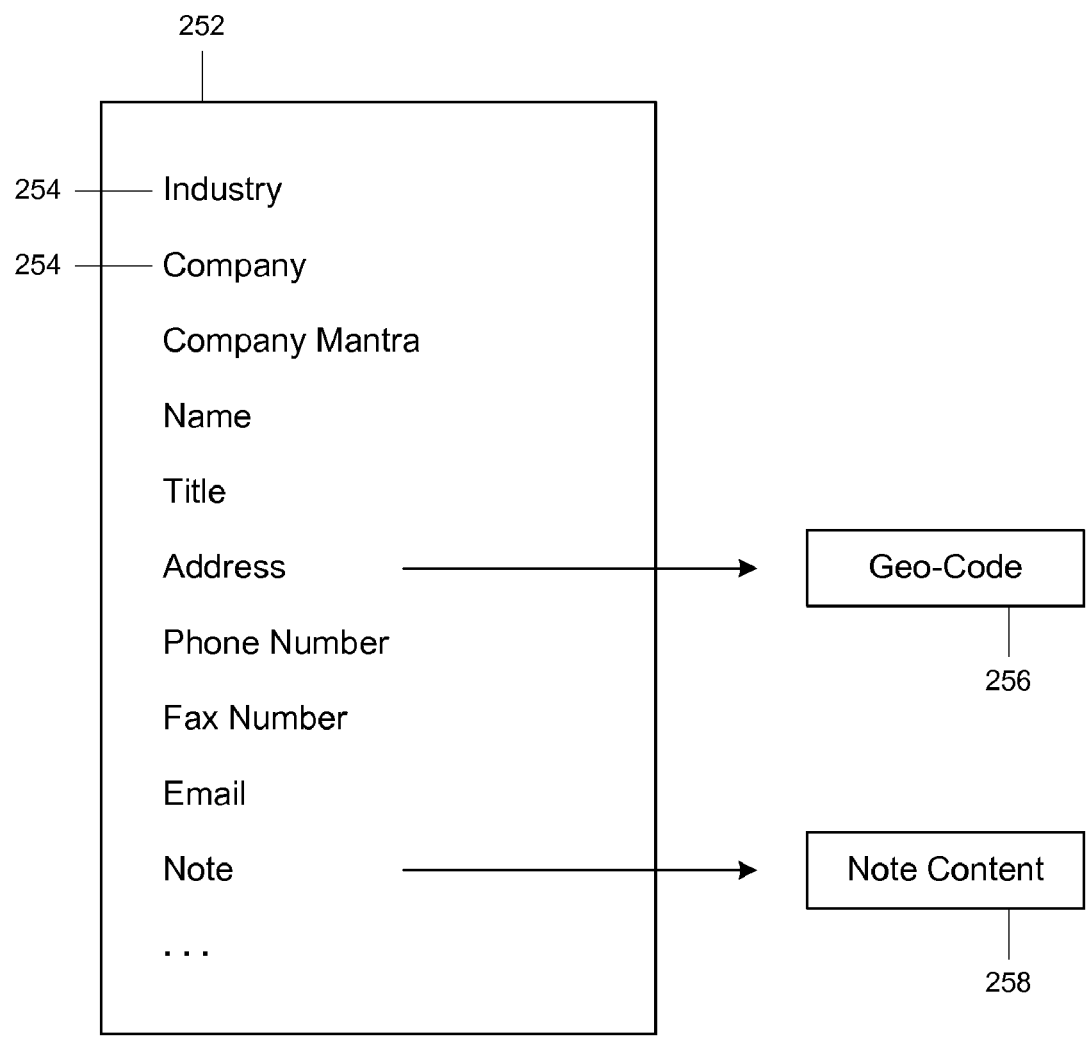
FIG. 4 schematically illustrates an exemplary data structure representing a contact data in an embodiment of the present invention.

Turning now to FIG. 4, it illustrates an exemplary data structure representing a contact data (or a contact entity) according to an embodiment of the present invention. The "data structure" 252 comprises various items, or elements, fields, or entries 254. These elements may include names, phone numbers, addresses, emails, home page URLs, etc. They may also include company/industry information, the job title, mottos, taglines, company mantras, etc. In an embodiment, other information such as a public key (e.g., in PKI) may also be included. In some embodiments, this information may be inputted when the contact entity is created (e.g., by the principal), or it may be subsequently updated. Certain fields may be mandatory and certain fields may be optional. In at least one embodiment of the present invention, the contact data is preprocessed/processed for easy handling or for certain purposes. For example, as shown in FIG. 4, additional data 256 associated with the address is maintained in the server according to this exemplary embodiment. The data 256 may comprise longitude and latitude of the location represented by the address. This information can be used, for instance, to (more readily) calculate the distance between two addresses. Furthermore, certain elements of a contact data may be automatically generated (as opposed to being input by a user). For example, the industry field may automatically be generated based on other elements such as a company name or a job title. In a certain embodiment, contact data 252 may include a link to the data stored somewhere else (e.g., in (a different row of) a different table in a relational database). For example, the note element in the figure is a link to the "real" data 258.

According to an embodiment of the present invention, permission value, or access level, may be associated with each public contact entity and/or each user. Only users with valid permission/access control for a given contact entity may be able to view (and possibly, edit) the contact data and/or shared comments, etc. In some embodiments, a certain subset of all (public) contact entities on a system may be accessible by users who are not part of the system (e.g., a non-registered user). According to an embodiment of the present invention, public contact entities (or contact data) may be classified into one of the following three groups: (a) those that are viewable by all registered users, (b) those that are viewable by all people (e.g., as long as they know the URL pointing to the contact entity, etc.), and (c) those that are viewable by only the users who are explicitly given the permission (e.g., by the principal of the contact entity, etc.). In a certain embodiment, certain contact entities may be "recommended" to other users (who have proper access levels), for example, based on the certain field values of the contact entities (e.g., industry, experience years, location, etc.).

Figure 5:
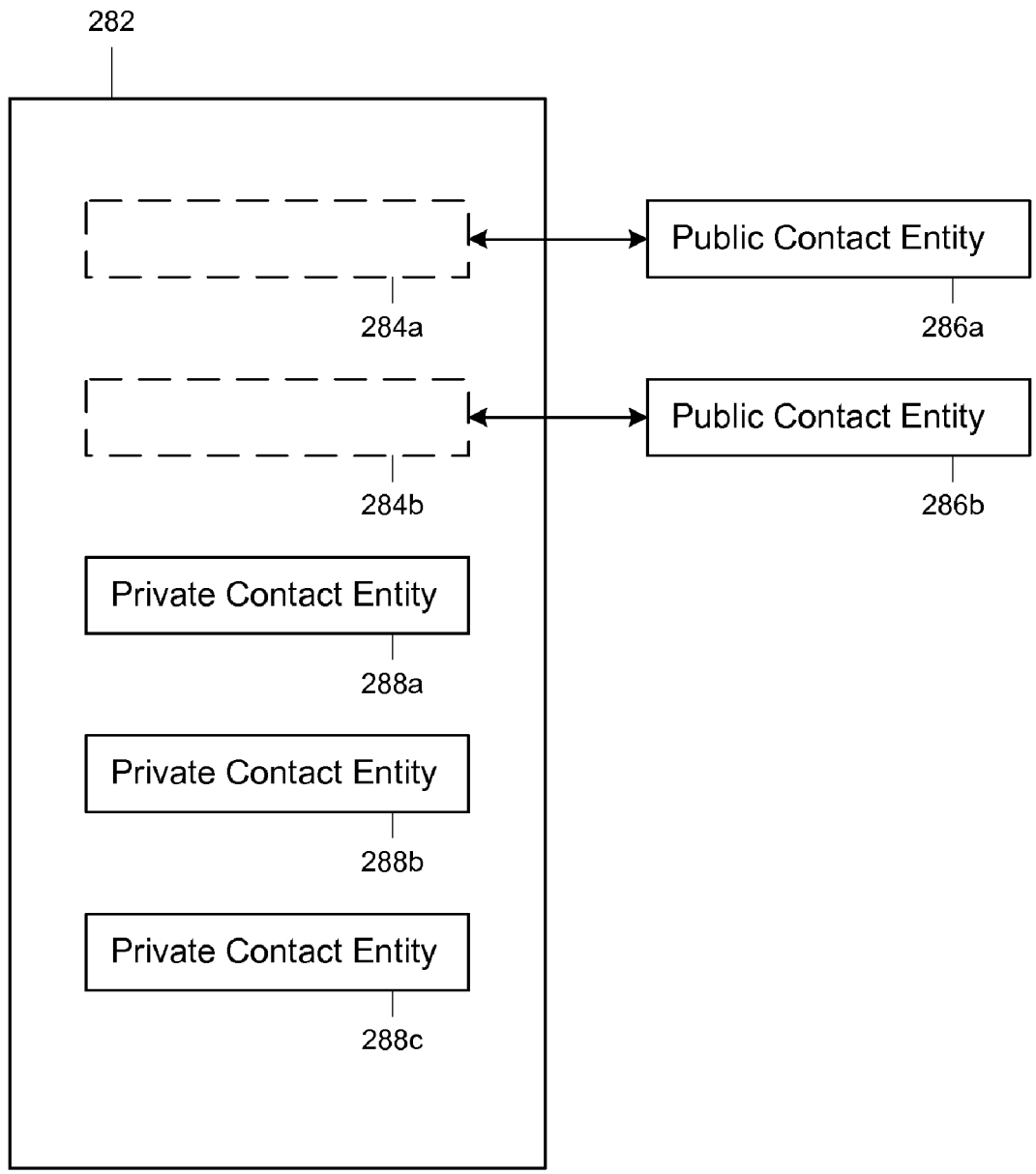
FIG. 5 shows an exemplary list of contact entities for a user according to an embodiment of the present invention.

Referring now to FIG. 5, the drawing shows an exemplary list of user-specific contact entities according to an embodiment of the present invention. The exemplary list 282 schematically represents an "address book" of a user. The list comprises zero or more public contact entities 284 and zero or more private contact entities 288. In particular, the exemplary list 282 in the figure includes two (references to) public contact entities, 284a and 284b, and three private contact entities, 288a, 288b, and 288c. As stated earlier, and as schematically shown in FIG. 5, the public contact entities 284 in a user's personal list are links or aliases to the shared public contact entities 286. For example, the entities 284a and 284b are links to the (real) public contact entities 286a and 286b, respectively. It should be noted that this is a many-to-one relationship. That is, each public contact entity may be linked into one or more personal contact lists (e.g., of different users). In some implementations, a copy of a public contact entity may be inserted into a user's contact list as a personal contact entity, which can be subsequently modified independent of the original public contact entity data. In certain embodiments, a user may maintain more than one address book (or, folder, etc.). In some cases, "tags" may be used to organized contact list. According to an embodiment of the present invention, a user's contact list is coupled with a notification/message service (and possibly, with a calendar service) so that certain events (such as birthdays, due dates, reminders, etc.) may trigger sending out notifications to the user (or other relevant parties, etc.). The notification can take a form of system-provided alerts or email messages or other predefined methods.

Figure 6A:
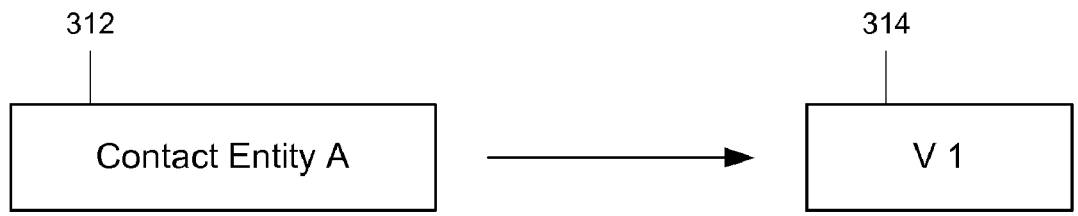
FIG. 6A illustrates an exemplary relationship between a contact entity and its underlying data in an embodiment of the present invention.
Figure 6B:
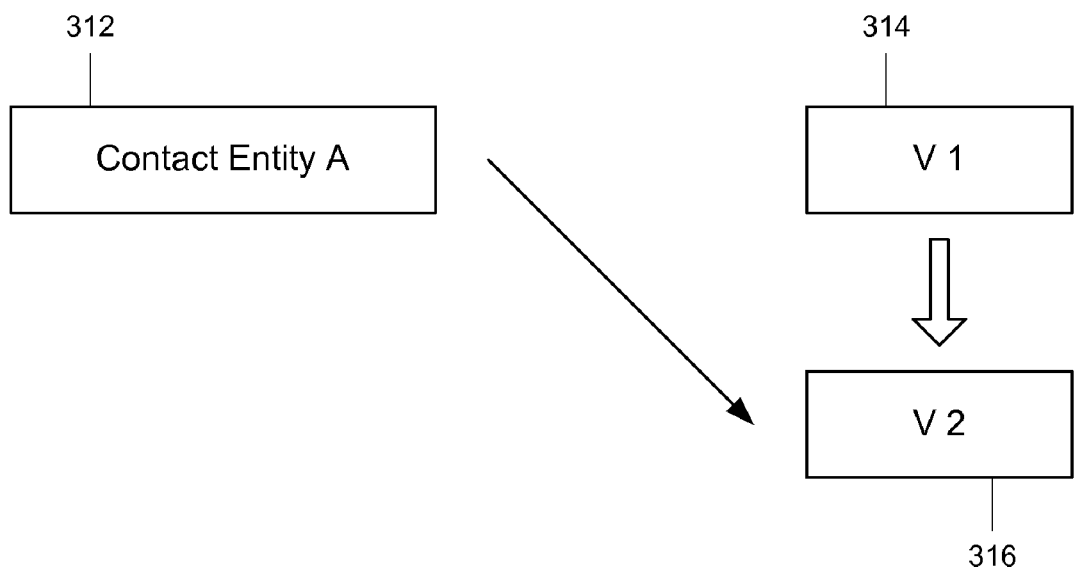
FIG. 6B illustrates an exemplary scenario in which the underlying data of a contact entity is updated according to an embodiment of the present invention.
Figure 6C:
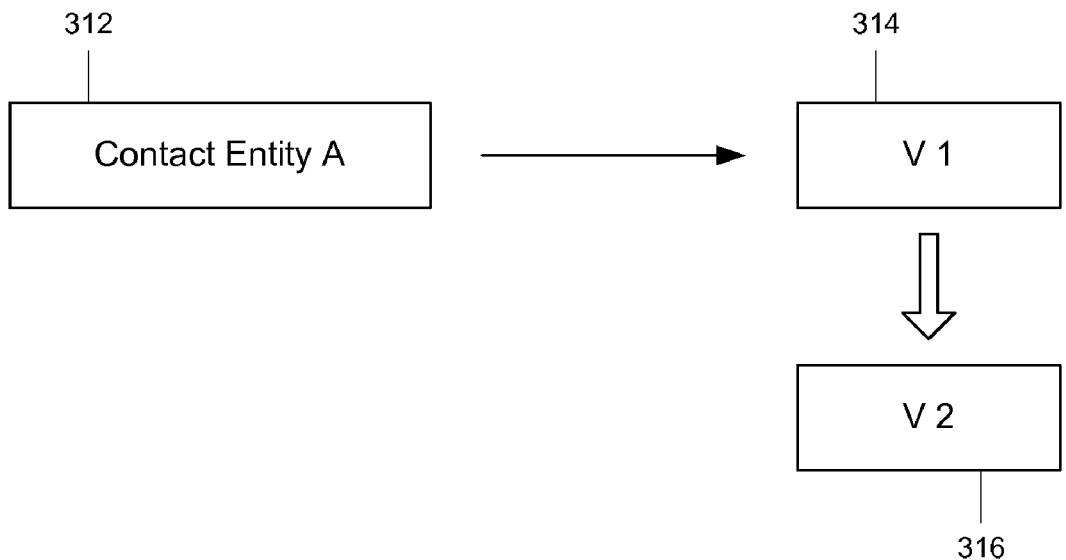
FIG. 6C illustrates another exemplary scenario in which the underlying data of a contact entity is updated according to an embodiment of the present invention.
Figure 6D:
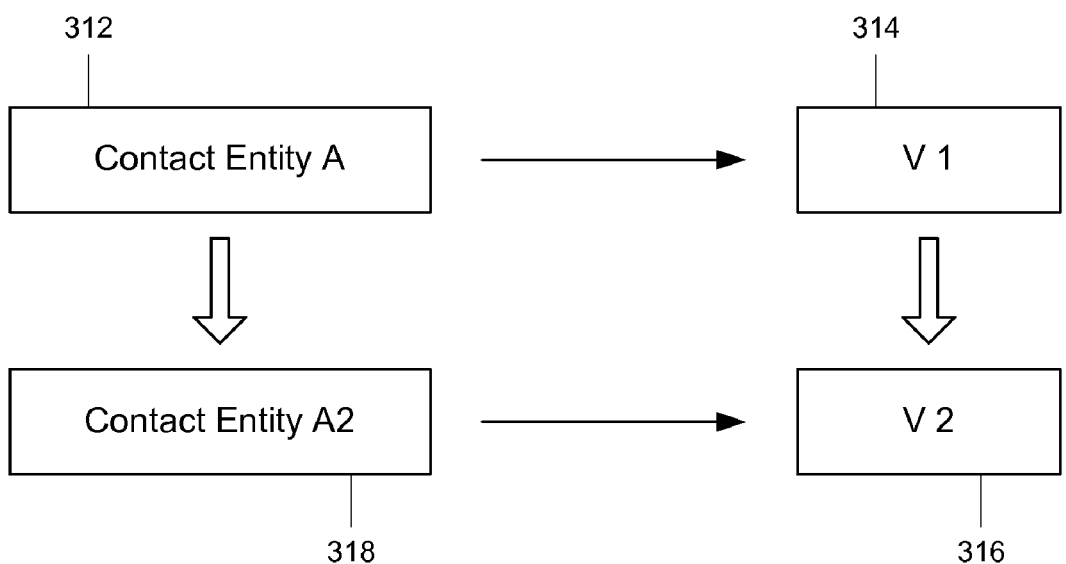
FIG. 6D illustrates yet another exemplary scenario in which the underlying data of a contact entity is updated according to an embodiment of the present invention.

In an embodiment of the present invention, updating contact data in a public contact entity (e.g., 286 of FIG. 5) automatically updates the content viewed by other users (e.g., through 284 of FIG. 5). A contact entity may be updated (created, deleted, etc.) by its principal. In some embodiments, the contact entities are versioned and updating the contact data of a contact entity may create a new version of the contact entity (e.g., depending on the characteristics of the changes, etc.). In a certain embodiment, the contact entity may be automatically redirected (or, re-linked, etc.) to the new version. In a certain other embodiment, a new contact entity is created corresponding to the new version (e.g., with the new data). This is illustrated in FIG. 6. FIG. 6A illustrates an exemplary relationship between a contact entity 312 and its underlying data 314 (e.g., of the first version) in an embodiment of the present invention. This is a schematic representation. These two, 312 and 314, may be one and the same object in a certain implementation. FIG. 6B illustrates an exemplary scenario in which the underlying data of a contact entity is updated according to an embodiment of the present invention. In this scenario, when the contact entity (or its data) is updated, e.g., from 314 to 316, the contact entity 312 (or its name, identifier, etc.) is automatically directed to the updated data 316 (e.g., the second version). This will be transparent to the users, and the users (with appropriate permissions) will always see the up-to-date contact information. FIG. 6C illustrates another exemplary scenario in which the underlying data of a contact entity is updated according to an embodiment of the present invention. In this scenario, the contact entity 312 remains to point to the old version 314 when the contact data is updated. In some cases, the contact entity may be explicitly re-linked to the new/updated data 316 (e.g., by the principal). In some embodiments, all versions (e.g., 314 and 316) may be included in a single data structure (e.g., 312) and an appropriate version of data may be retrieved through a well-defined interface (e.g., API). In a certain embodiment, versioning is used only for the contact data part (204 of FIG. 3A). In some implementations, the contact data of the latest version may be updated (e.g., by the principal). In some cases, only a certain number of most recent versions are maintained. Certain versions may also be deleted. FIG. 6D illustrates yet another exemplary scenario in which the underlying data of a contact entity is updated according to an embodiment of the present invention. In this example, updating a contact data, e.g., from 314 to 316, automatically creates a new contact entity, 318, separate from its "parent", 312. In a certain embodiment, certain data such as shared comments are "inherited" (e.g., copied) while a new (child) contact entity is created. In a certain other embodiment, certain data such as shared comments may be shared (e.g., with a single data object).

According to an embodiment of the present invention, permission/access control level is associated with each public contact entity and/or each user. Only users with valid permission for a given contact entity may be able to view the contact data and/or shared comments, etc. In a certain implementation, related contact entities (e.g., 312 and 318 of FIG. 6) may have the same permission settings. For example, the access level of 318 may automatically inherit from that of 312 when a new version is created. In a certain other implementation, different permission settings may be set to these contact entities. In some embodiments, each version (e.g., 314 or 316 of FIG. 6) might have a separate permission level/setting associated with it. (For example, a particular user might be able to view the old contact data (e.g., 314) but not the updated one (e.g., 316).)

According to a certain embodiment of the present invention, the principal of a public contact entity may be able to set permission levels associated with the contact entity for each user (e.g., a "direct" permission, or a direct/first-order link), for each job type, for each category, etc. In a certain embodiment, a degree of separation, or a certain closeness relationship, is defined between users on a system, for example, based on the direct permission relationships. Additional permission values may be set according to the degrees of separation. When person A gives a permission to view one of his or her own (public) contact entity to person B (e.g., by selecting (e.g., from the user list on the system) and explicitly including person B in the permission list, etc.), there is established a direct link relationship with one level of D.O.S. (degree of separation) between these two persons. If person B gives a permission to view one of his or her own (public) contact entities to person C, persons B and C have a direct link relationship with one level of D.O.S., and persons A and C have a relationship with two levels of D.O.S. It should be noted that D.O.S. is an asymmetric (or, one-way) relationship in this illustration. Mutual permission may be set by establishing two such asymmetric relationships (in either direction). According to at least one embodiment, the relationship is defined to be always symmetric. That is, for example, if person A includes (one of) person B's contact entity, (the default or all of) contact entity(s) of person A is automatically included in person B's contact list, etc. In an embodiment of the present invention, a direct-link relationship from user A to user B is established by a) user A sending a token to user B (e.g., through email), and b) user B registering the token on the system. The token may comprise a secret string representing the public contact entity and/or allowed permission levels, etc. The token may just be the identifier (e.g., a URL) of the public contact entity in some embodiments.

Figure 7:
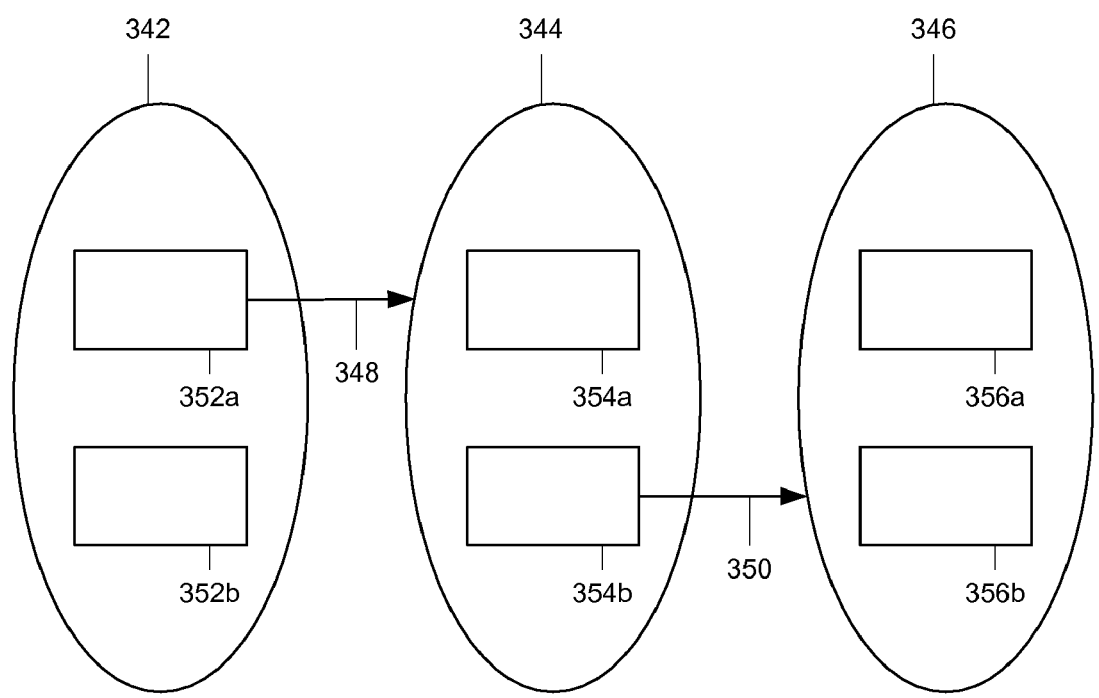
FIG. 7 is a schematic diagram illustrating an exemplary relationship among different contact entities and users in an embodiment of the present invention.

FIG. 7 is a schematic diagram illustrating an exemplary relationship among different contact entities and users in an embodiment of the present invention. The three ovals, 342, 344, and 346, represent users (e.g., registered users on a server). The rectangles, 352a/352b, 354a/354b, and 356a/356b, represent their public contact entities of users, 342, 344, and 346, respectively. Each user in this example has two contact entities. User 342 gives user 344 a permission to view his contact entity 352a and user 344 gives user 346 a permission to view her contact entity 354b. This (asymmetric) relationship is represented by arrows 348 and 350 in the figure. In an embodiment of the present invention, direct-link permission setting may be set with "propagation" property. For example, user 342 may give user 344 and only to her (propagation level 0) the permission to view the contact entity 352a. In that case, user 346 may not be able to view the contact entity 352a (that is, if he does not have other permission levels that allows him to view 352a). If, however, user 342 gives user 344 the permission with propagation level 1 (or, higher), user 346 may be able to view the contact entity 352a (e.g., because user 344 have given user 346 permission to view at least one of her contact entities). According to an embodiment of the present invention, permission levels/permission propagation levels may be (additionally) set to a group of users (e.g., users in a particular industry, users in a particular company, users in a particular geographical location, etc.). For example, a user may set his contact info to be viewable by all users who are given explicit permissions and by all users who belong to certain industries, etc. Attributes such as industries or job titles may also be organized with certain propagation levels defined among them (e.g., in a graph-like structure). According to at least one embodiment of the present invention, this "social networking" aspect of (public) address book or contact list is used for various purposes. For example, a user may want to send emails to all users in her industry and all industries within "one hop", etc.

Figure 8:
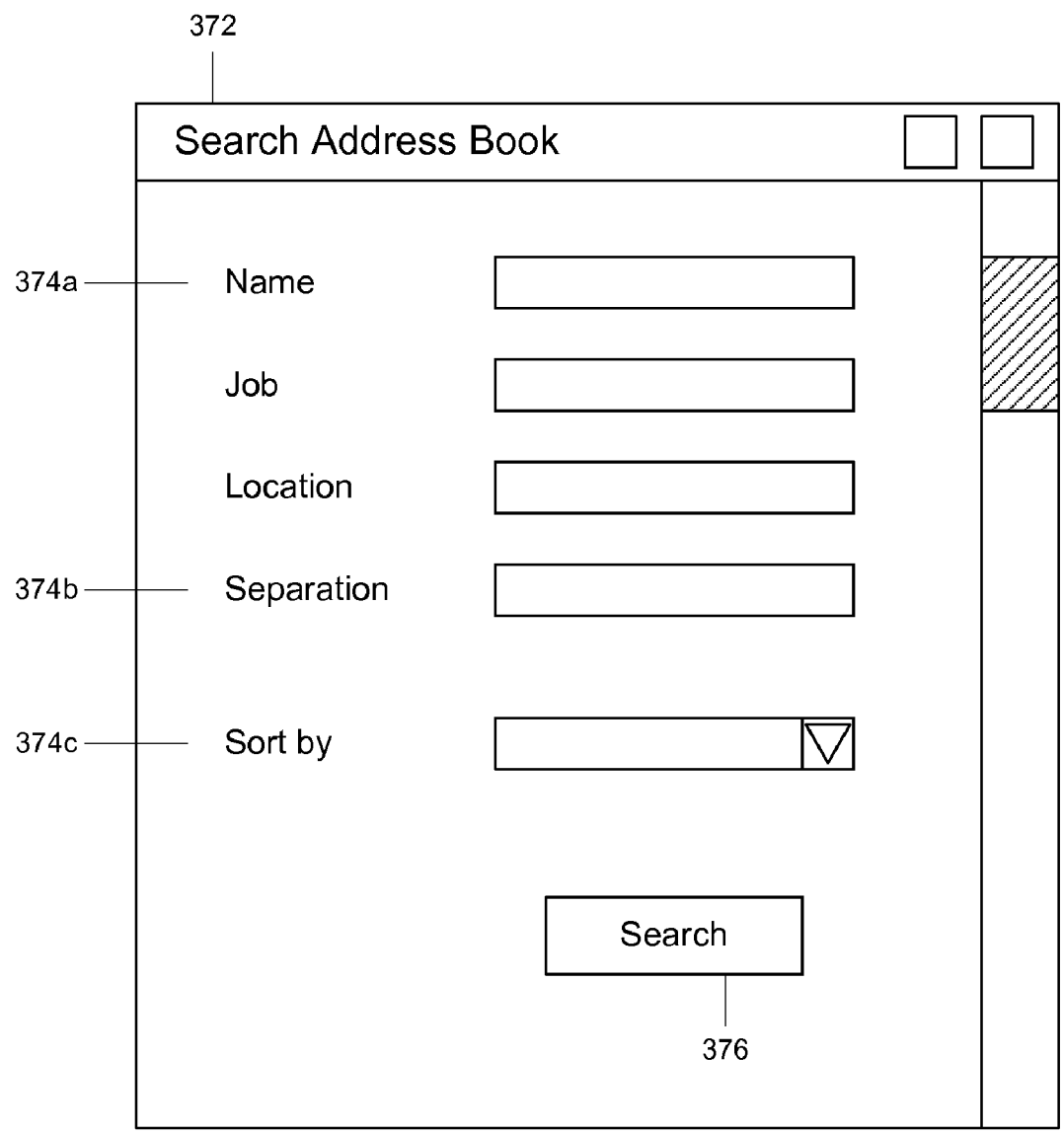
FIG. 8 shows an exemplary user interface screen for searching contacts in an embodiment of the present invention.

In some embodiments of the present invention, contact entities may be searched and retrieved based on various criteria including names, job titles, industries, etc. Contact entities may also be searched based on, or weighted by, degrees of separations (D.O.S.). For example, a user may search for a plumber who is "closest" to him or her in terms of geographical locations and/or in terms of degrees of separation. FIG. 8 shows an exemplary user interface screen 372 for searching contacts in an embodiment of the present invention. The window 372 includes various (mandatory/optional) search criteria 374 and search action button 376. The example includes a name field 374a, job title, and location, etc. As shown in the figure, a search query may also be limited based on, for example, degrees of separation 374b (e.g., less than 3 D.O.S. etc.). Other fields such as industries and ratings, etc. (not explicitly shown in the figure) may also be used depending on application types. The search result may be sorted by certain criteria (e.g., listing contacts with smaller D.O.S. first, etc.), for example, using a combobox UI 374c. In some cases, "commercial" or "sponsored" contacts may be displayed on the search result screen based on certain algorithms (e.g., based on relevancies, D.O.S constraints, etc.). According to an embodiment, search may be done in a "question-and-answer" format. For example, a user may submit a question such as "Can anybody recommend a good dentist in the area?" (to all users on the system, to users in her contact list, or to users within a certain D.O.S, or based on location and industry, etc.). The answer may be automatically provided by the system based on the user's location and her contacts' recommendations for dentists, etc. Alternatively, other users (e.g., within a certain D.O.S from the user, etc.) may answer the question, for example, on a forum or through private communications, etc. In some cases, a user may be allowed to post an announcement such as "I just went to see an eye doctor, and she was terrific", etc.

According to an embodiment of the present invention, a business card (either paper-based or electronic such as vCard) is used to "define" a contact entity. In certain cases, a business card is directly linked to a contact entity and the contact data in the business card is substantially the same as the contact data included in the corresponding contact entity. In some embodiments, the image of a (paper) business card (or, a part of it, etc.) is also stored with the contact entity (e.g., after a certain preprocessing, etc.). A business card may be used to create a contact entity (public or private), for example, scanning the business card and using OCR (optical character recognition) software. Copies of the same business card are associated with a single unique contact entity. In a certain embodiment, a business card has a unique identifier associated with it and the identifier is used to identify a contact entity (such as a URL, as stated earlier). The identifier may be printed on a (paper) business card as a human readable or machine readable form (e.g., a barcode, RFID, etc.). In a certain embodiment, (part of) the image of a business card (e.g., in a binary format) is used as an "identifier". The image may include the background image and contact data (e.g., in alphanumeric characters).

Figure 9A:
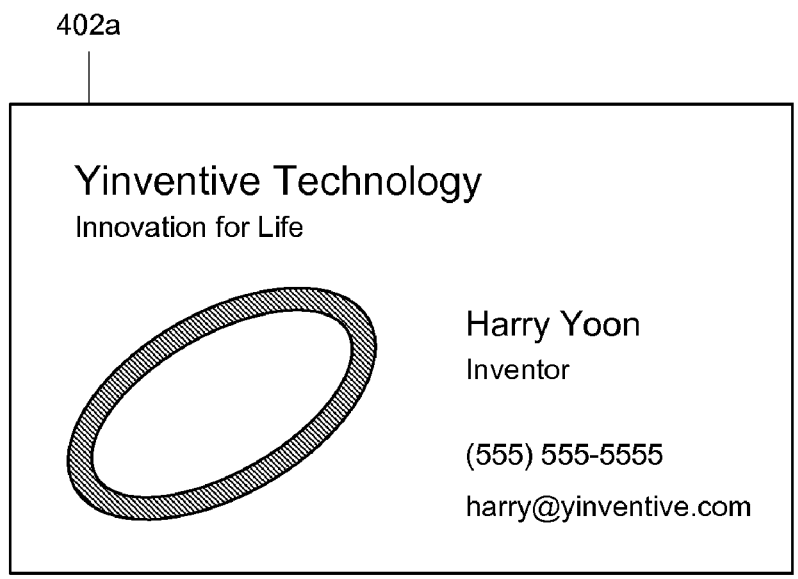
FIG. 9A illustrates a front side of an exemplary business card according to an embodiment of the present invention.
Figure 9B:
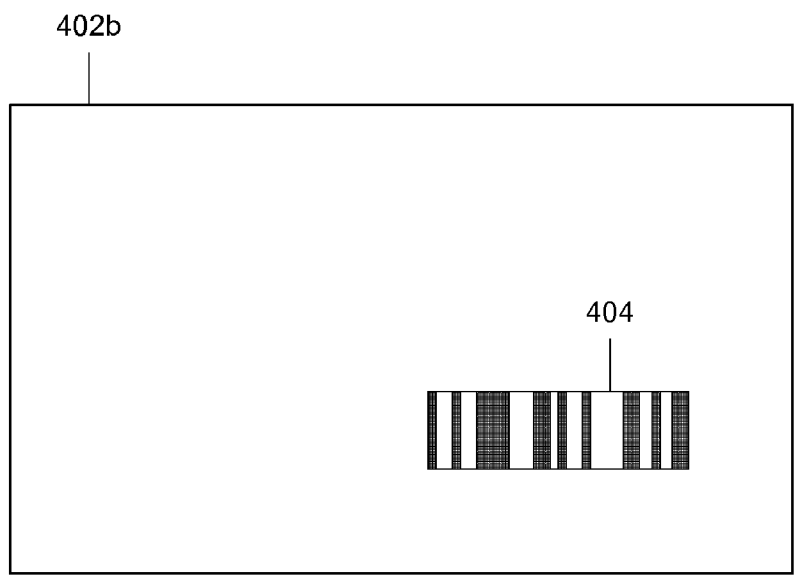
FIG. 9B illustrates a back side of an exemplary business card according to an embodiment of the present invention.

FIG. 9A illustrates a front side of an exemplary business card 402a according to an embodiment of the present invention, whereas FIG. 9B illustrates a back side of an exemplary business card 402b according to an embodiment of the present invention. The exemplary business card contains a barcode 404 encoding the business card's unique identifier (or, the identifier associated with the corresponding contact entity). In a certain embodiment, the identifier may (also) be printed in a human-readable form (e.g., in alphanumeric strings). In an embodiment of the present invention, a business card may be used to establish a direct link relationship (e.g., as a "token" mentioned earlier with respect to FIG. 7). For example, if person A has a business card of person B, person A automatically has a permission to view the contact entity (of person B) associated with the business card. This may be achieved by person A inputting the person B's business card's identifier or other tokens (e.g., printed on the business card) into the system. In some embodiments, electronic (or, virtual) business cards may be used for this purpose. In certain embodiments, certain electrical tokens (e.g., a URL with a certain private string) may also be used to establish the direct link relationship.

Figure 10A:
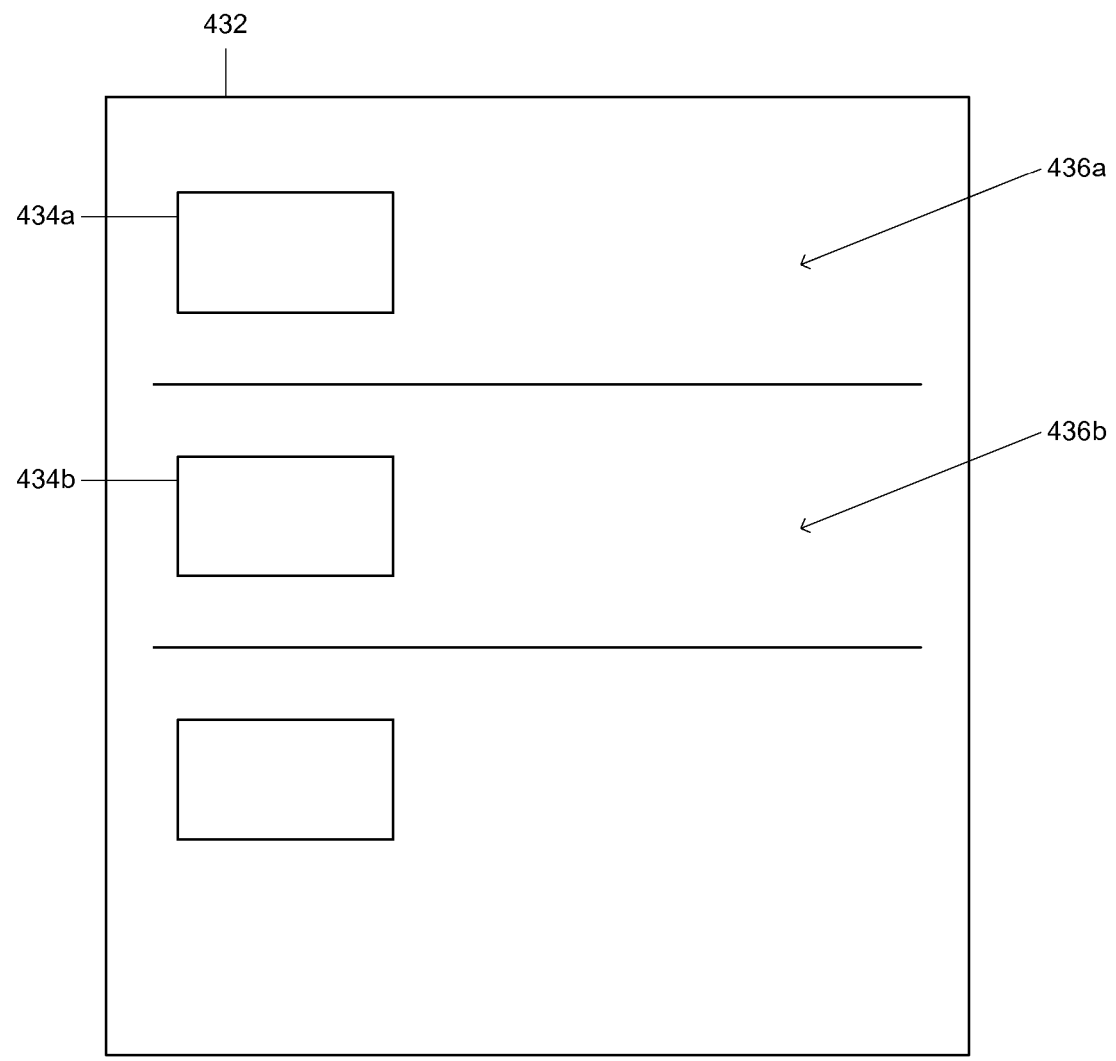
FIG. 10A shows an exemplary "listing view" in an embodiment of the present invention.
Figure 10B:
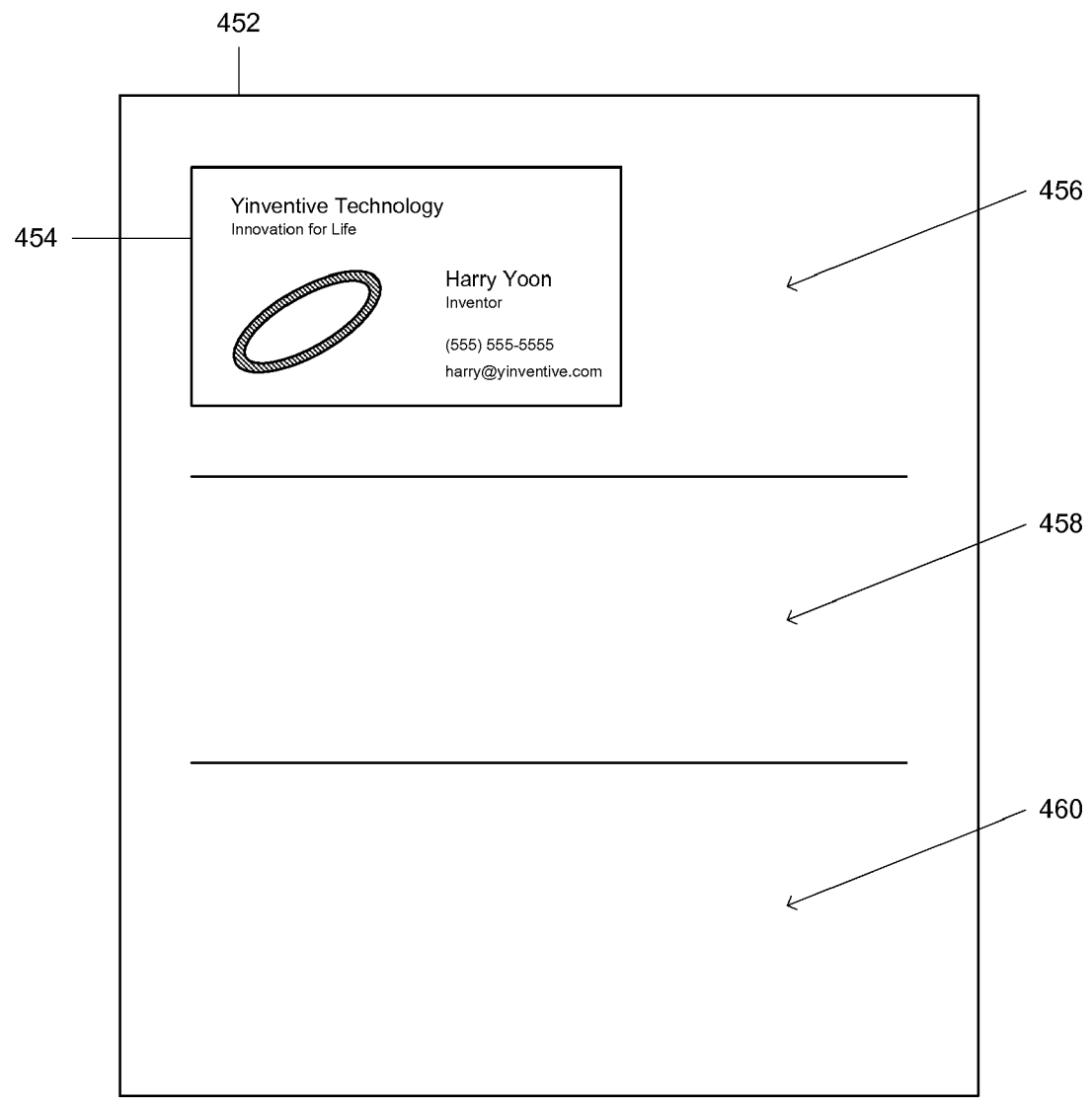
FIG. 10B shows an exemplary "profile view" in an embodiment of the present invention.

FIG. 10A shows an exemplary listing view 432 in an embodiment of the present invention. The exemplary listing 432 comprises a (selected) list of contact entities (for a given user, or based on a search query, etc). According to an embodiment, the listing screen 432 includes business card images, 434a and 434b. In each row, additional information (e.g., names, email addresses, summaries of shared comments, etc.) is displayed, in the areas 436a and 436b, in this example. The list may be based on the (viewing) user's permission levels, etc. A detailed view may also be provided, for example, when a business card image, or other link, is clicked by a user. FIG. 10B shows an exemplary profile/detail view 452 of a contact entity in an embodiment of the present invention. The exemplary screen 452 includes the image of the business card 454 and some additional data, displayed in areas 456, 458, and 460. The area 456 may include contact data, whereas areas 458 and 460 may be used to display shared comments (e.g., 206 of FIG. 3A) and personal memos (e.g., 208 of FIG. 3A), respectively. In the case of private contact entities, there may be only two display areas rather than three. In a certain embodiment of the present invention, the display may be customizable by a user. The (editable part of) contact entity may be edited from these UI screens (e.g., by opening an editor window using a button, etc.).

Figure 11:
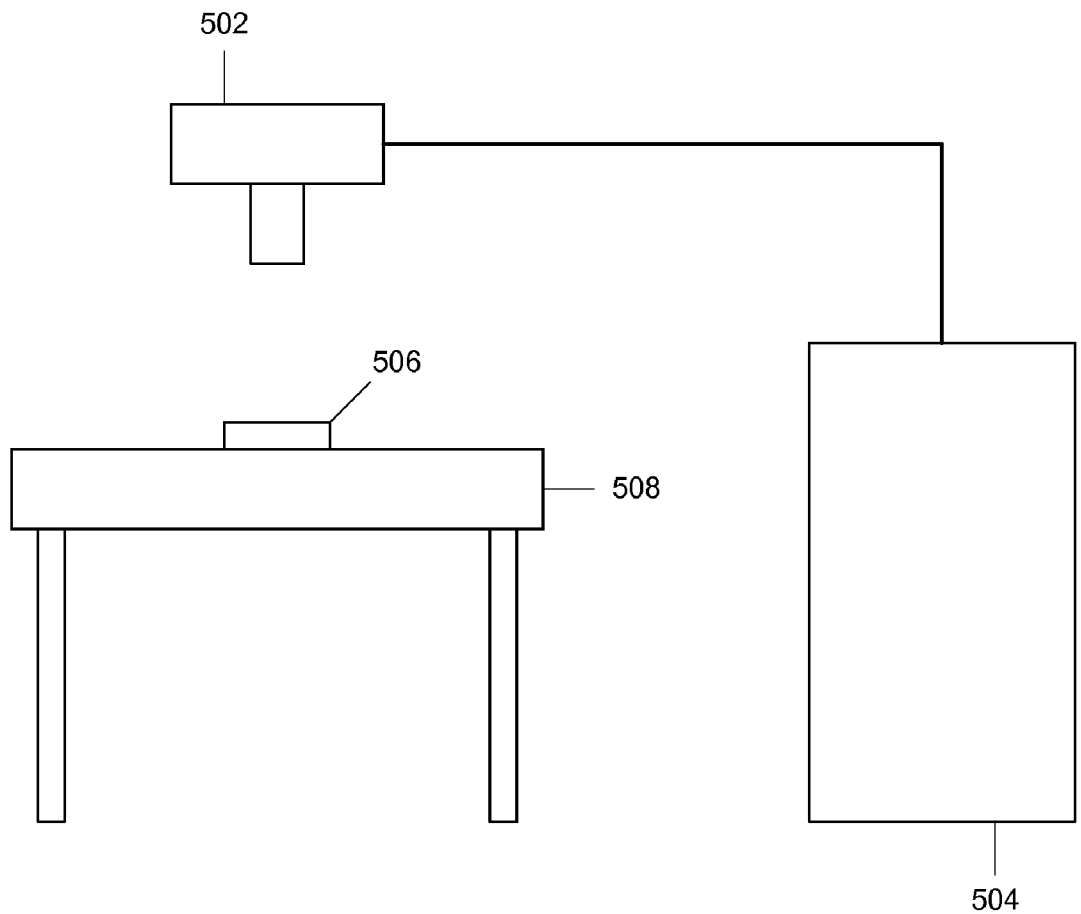
FIG. 11 illustrates an exemplary system for reading a business card according to an embodiment of the present invention.
Figure 12:
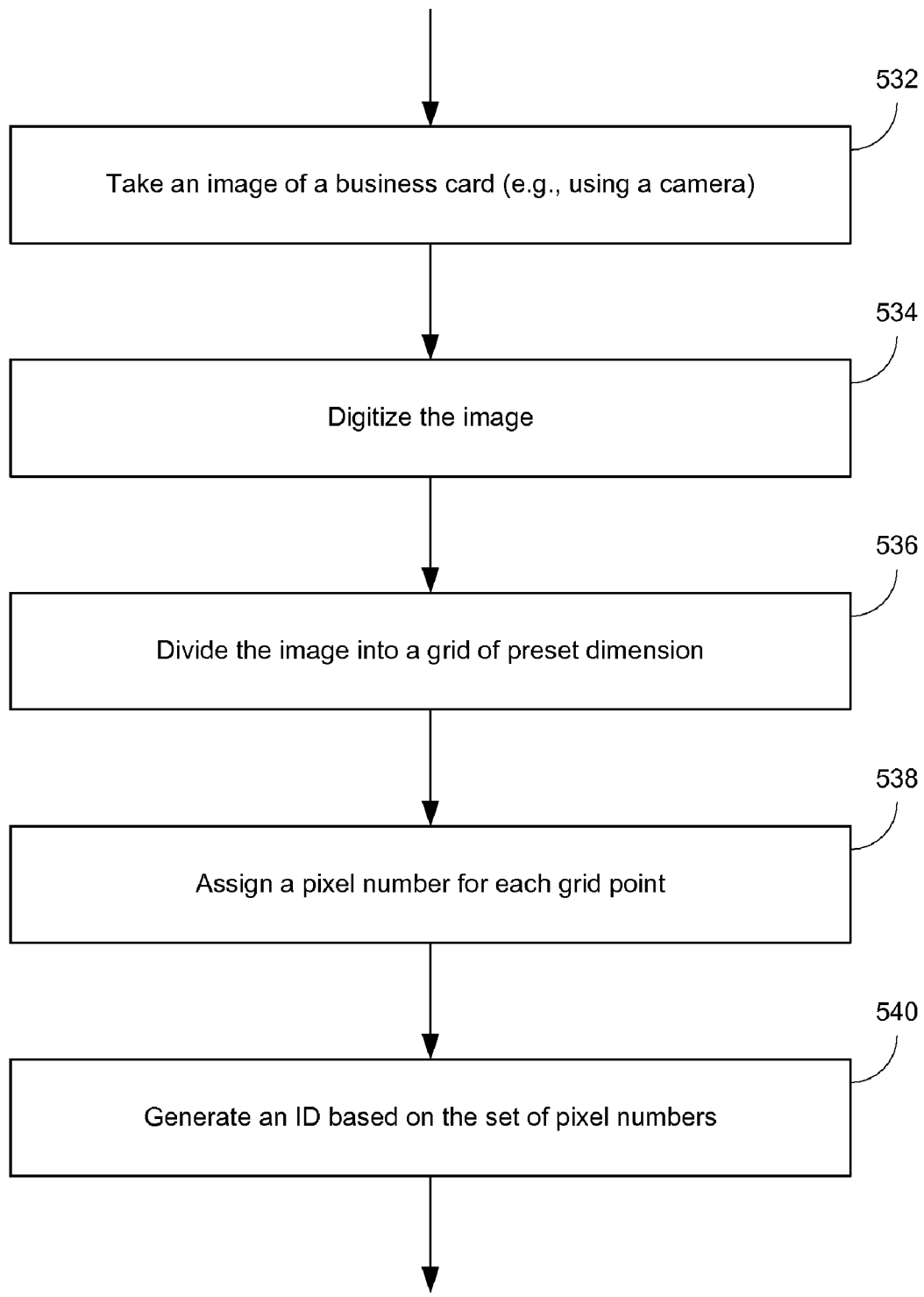
FIG. 12 illustrates an exemplary process for reading a business card as a flow chart according to an embodiment of the present invention.
Figure 13A:
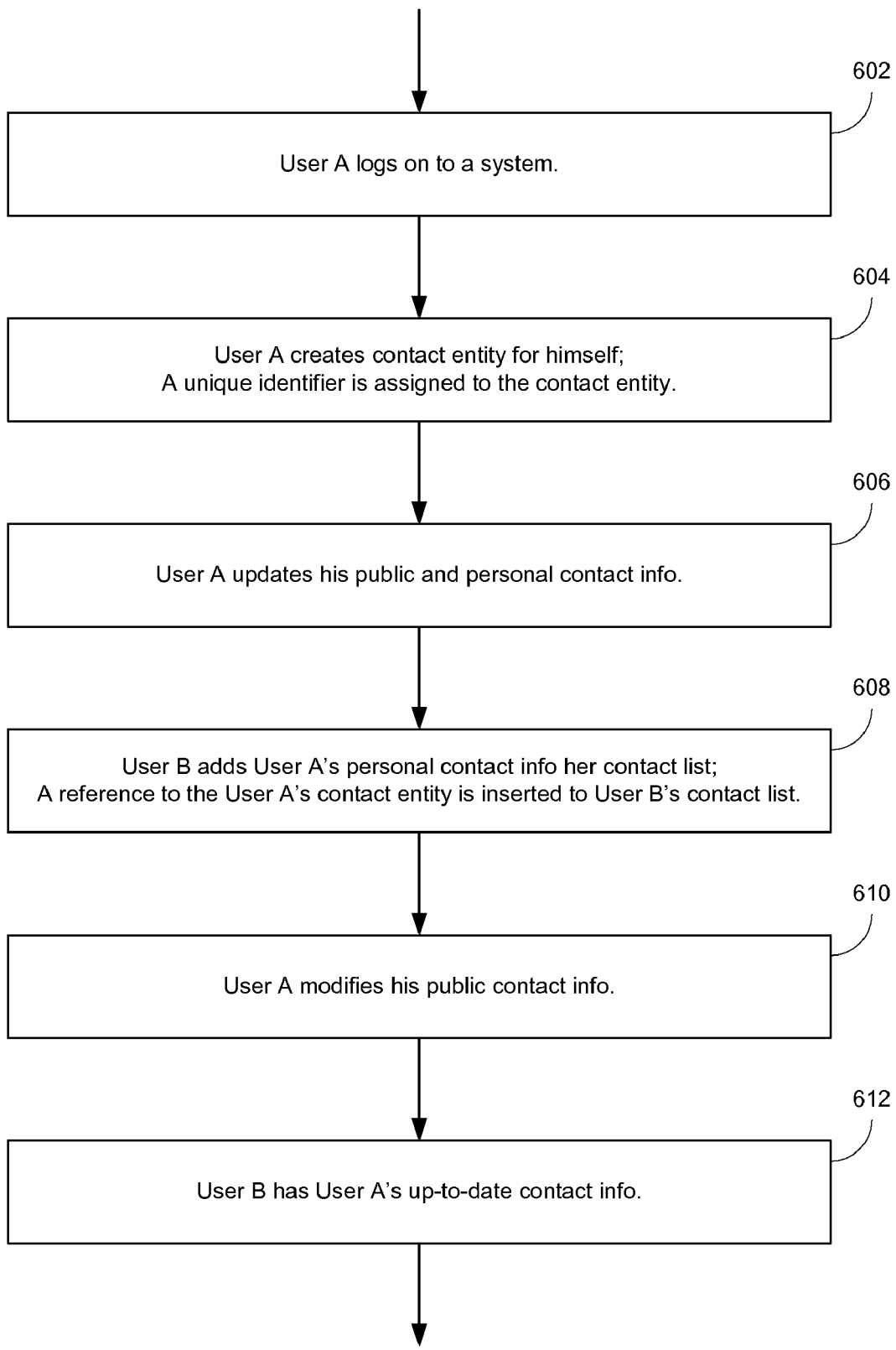
FIG. 13A shows an exemplary use case according to an embodiment of the present invention.
Figure 13B:
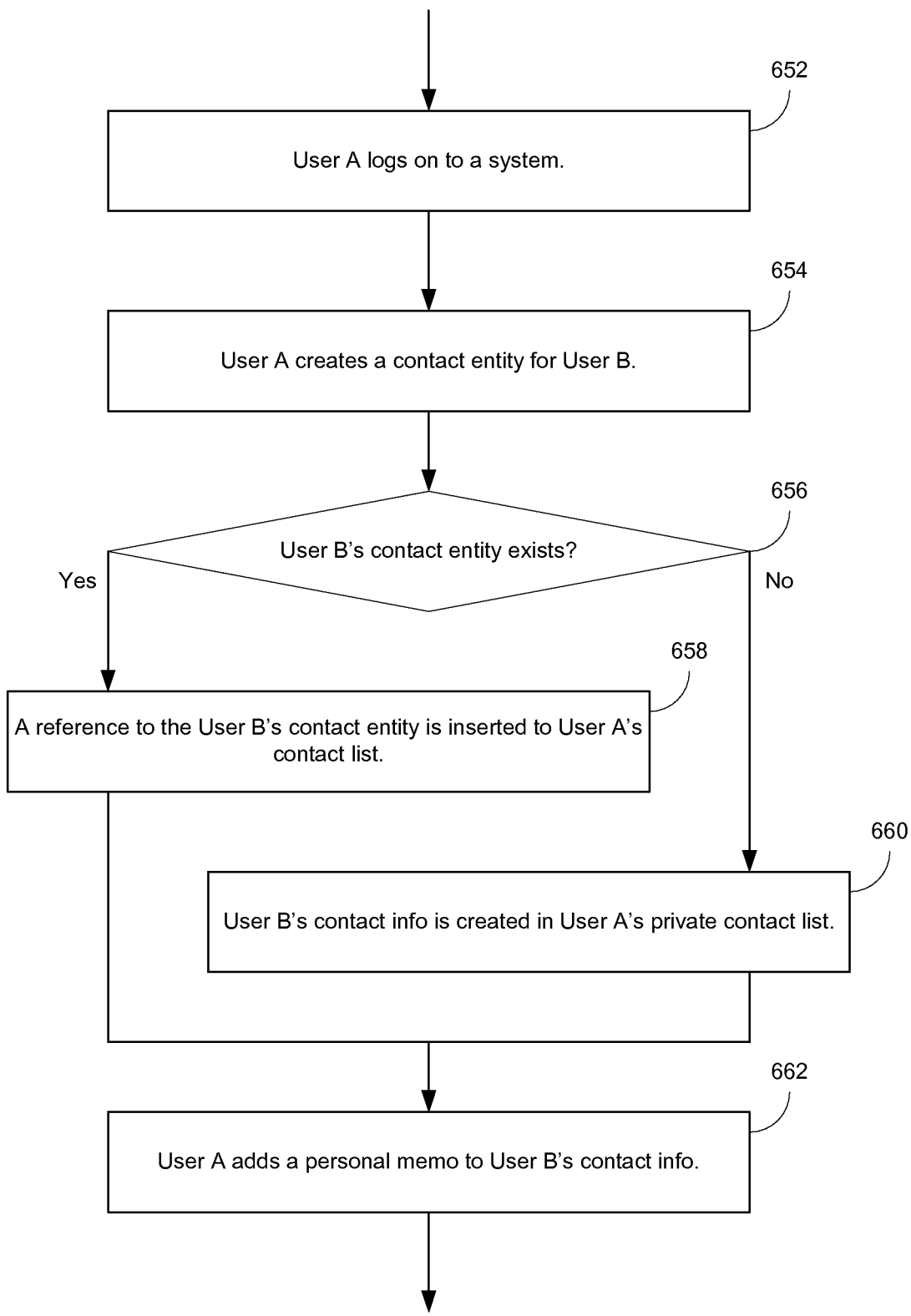
FIG. 13B shows another exemplary use case according to an embodiment of the present invention.

Turning now to FIG. 11, an exemplary system for reading a business card according to an embodiment of the present invention is illustrated. The figure shows a business card 506 placed on a stable platform 508 (e.g., an office desk). The business card is read by a camera 502 coupled to a data processing system 504 such as a personal computer (e.g., as shown FIG. 2). The system may comprise an image processing software, and an OCR software, etc. The image taken from the camera 502 is then stored and/or further processed. FIG. 12 illustrates an exemplary process for reading and processing a business card according to an embodiment of the present invention. The flow chart shown in figure begins by taking the image of a business card at block 532. In some embodiments, the image is preprocessed to reduce the noise dependency, etc. The image (or part of it) is then digitized, at 534, and divided into a grid, at 536. In an embodiment, N rows and M columns of rectangular cells are used. Next, a value is assigned to each pixel or cell, at 538. In an embodiment, a quantized value of intensity level is used as a pixel value. In another embodiment, the color value or values (in a certain representation) is used. Then, an identifier of the business card is generated, at block 540, using a set of these pixel values. In a certain embodiment, a concatenated string of N*M pixel values (e.g., concatenated in a certain predefined order of pixels, etc.) are used. In a certain other embodiment, further processed values are used (e.g., using a certain function of further quantized pixel values, etc.) to generate an identifier. In some case, part of the contact data (e.g., read through OCR software, etc.) is used (as well) in generating the identifier. According to at least one embodiment of the present invention, when a business card is used for identifier purposes, a redundant image comparison routine is further employed. When a new business card is inputted, its identifier is generated and it is compared with the existing identifiers. If there are any similar identifiers on the system (e.g., according to a certain predefined metric), those images are directly compared with the new image. If any of them turns out to be identical (e.g., within a certain predefined tolerance level), the identifier generated from the existing image is used for the new image as well. In a certain embodiment, all images are stored on a database, and a certain clustering algorithm is used to identify the identifier for a given business card image.

With reference now to FIGS. 13-16, various exemplary methods are illustrated according to some embodiments of the present invention. FIG. 13A is an exemplary use case illustrating a scenario for registering/uploading a business card (or contact information) on a server. The exemplary process begins when a user first logs on to the system at 602 (e.g., after registering himself, etc.). The user then creates his (public) contact info at 604 and 606. A unique identifier is assigned to the contact entity (whose principal is user A). User B then finds the contact info of user A (e.g., through search, or getting the identifier in some way, etc.) adds it to her contact list, at 608. In some embodiments, (internally) a reference to the contact entity is inserted into user B's contact list. When user A modifies his contact info, 610, it is automatically reflected in her contact list, as indicated in block 612. It should be noted that, in some cases, explicit reference to the words references or links may be omitted. Their meaning, however, should be clear to a person of ordinary skill in the pertinent art depending on the context and the teachings of this disclosure. FIG. 13B illustrates another exemplary use case according to an embodiment of the present invention. In this example, user A first logs on to the system at 652. Then he adds a contact info for user B at 654. The system searches for user B's (public)) contact info on database (e.g., based on certain fields such as names, occupations, phone numbers, etc.), as shown in block 656. If the system finds similar contact entities (e.g., according to a preset threshold for similarity between contact entities), they are prompted to user A for confirmation. If the user selects one of the existing contact entities, the existing contact entity (or its reference) is added to the user's contact list at 658. If not, the contact info of user B is included as a part of user A's personal contact list at 660. In either case, user A may add (personal) comments and memos regarding user B, as indicated in 662, etc.

Figure 14:
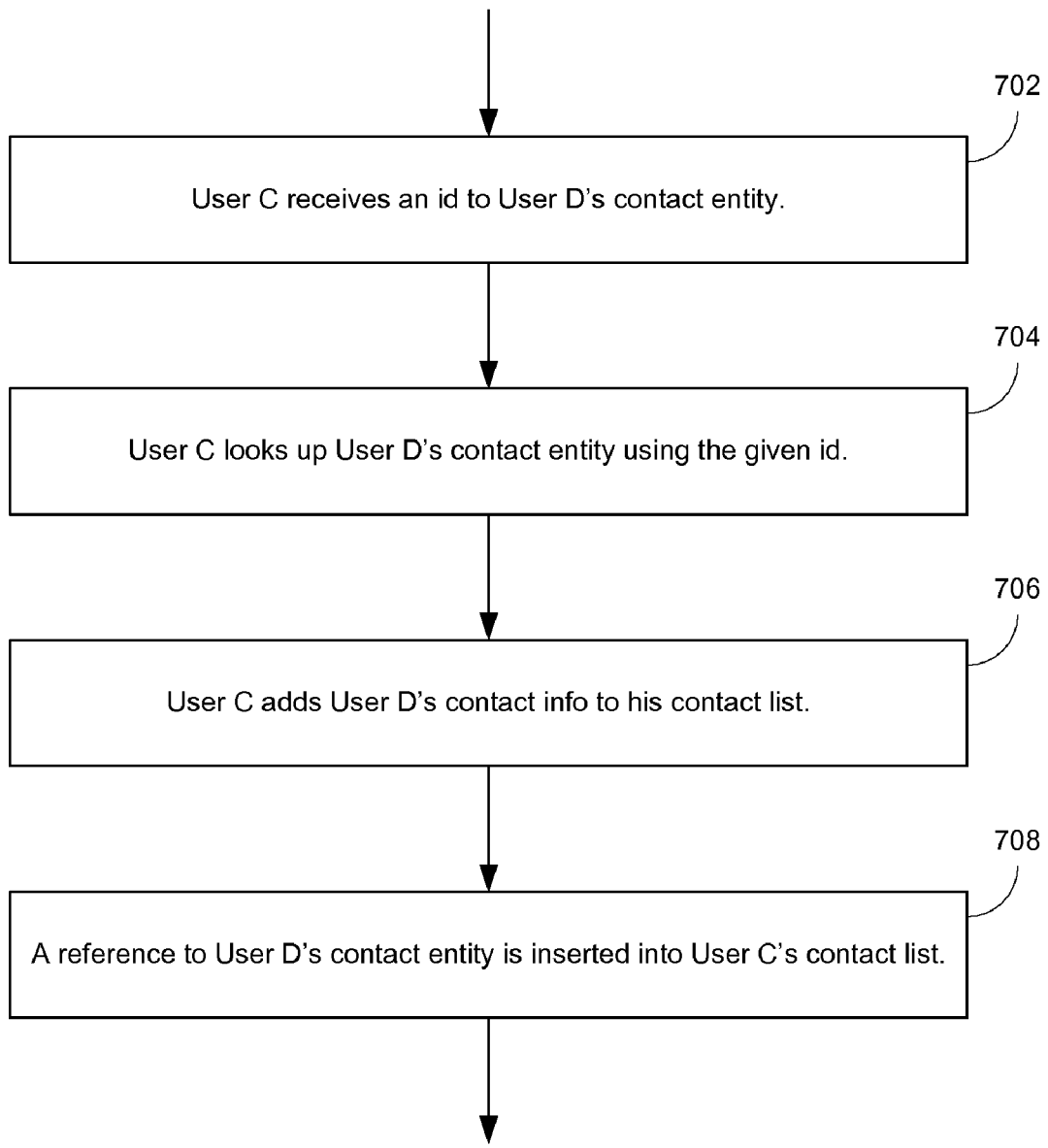
FIG. 14 is a flow chart illustrating an exemplary use case according to an embodiment of the present invention.
Figure 15:
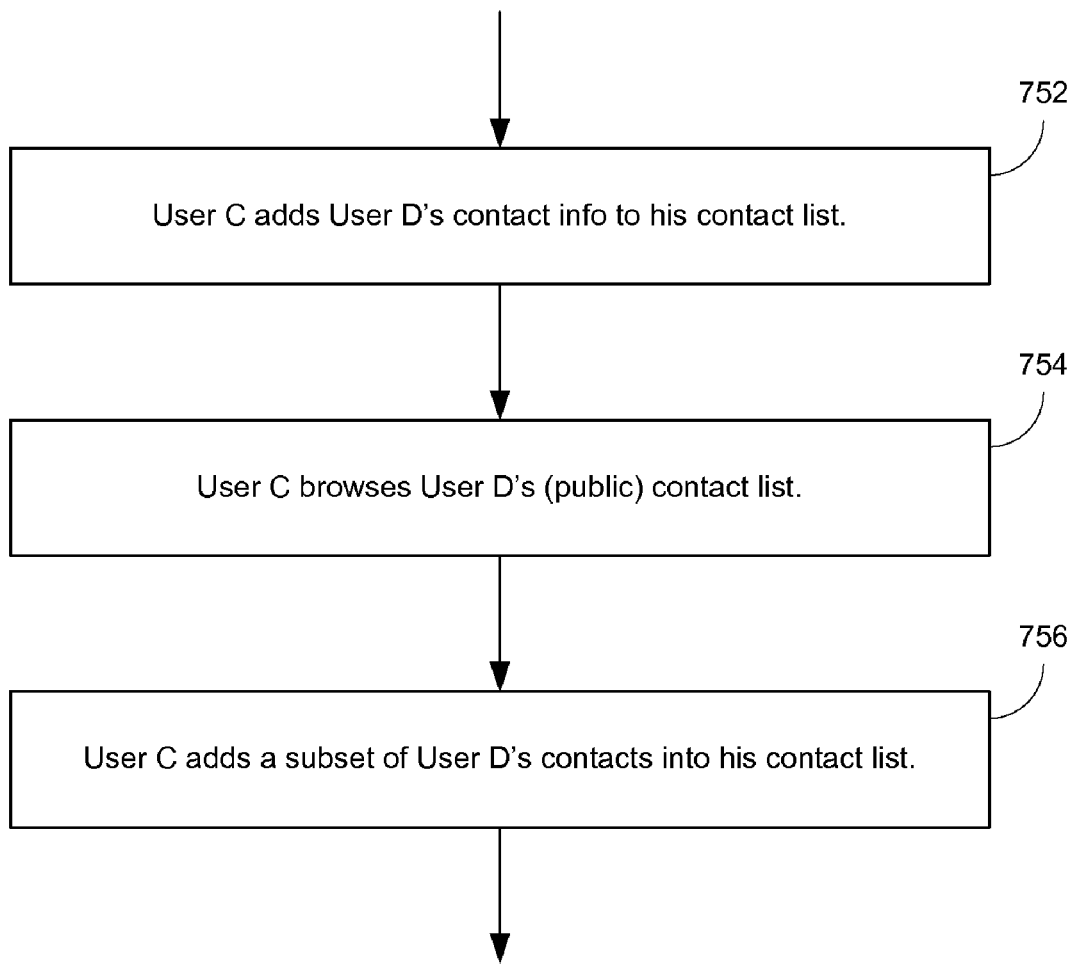
FIG. 15 is a flow chart illustrating an exemplary use case according to an embodiment of the present invention.

FIG. 14 is an exemplary use case according to an embodiment of the present invention illustrating a scenario for exchanging business cards (or contact information). The exemplary use case starts when user C obtains a contact identifier of user D, at 702, in some way (e.g., through an email, from a business card, etc.). User C then looks up the contact entity using the identifier at 704 and "imports" the contact info into his contact list at 706. In some embodiments, the reference to the user D's contact entity is included in user C's contact list, as illustrated in block 708. FIG. 15 shows another exemplary use case according to an embodiment of the present invention. User C adds user D to his contact list at block 752. In a certain embodiment, this enables user C to browse (a certain subset of) the contact list of user D, as indicated in 754. In a certain other embodiment, they may be automatically imported to user C's contact list. In the exemplary process shown in FIG. 15, user C may select a certain subset of user D's contacts and include them into his contact list, at 756.

Figure 16A:
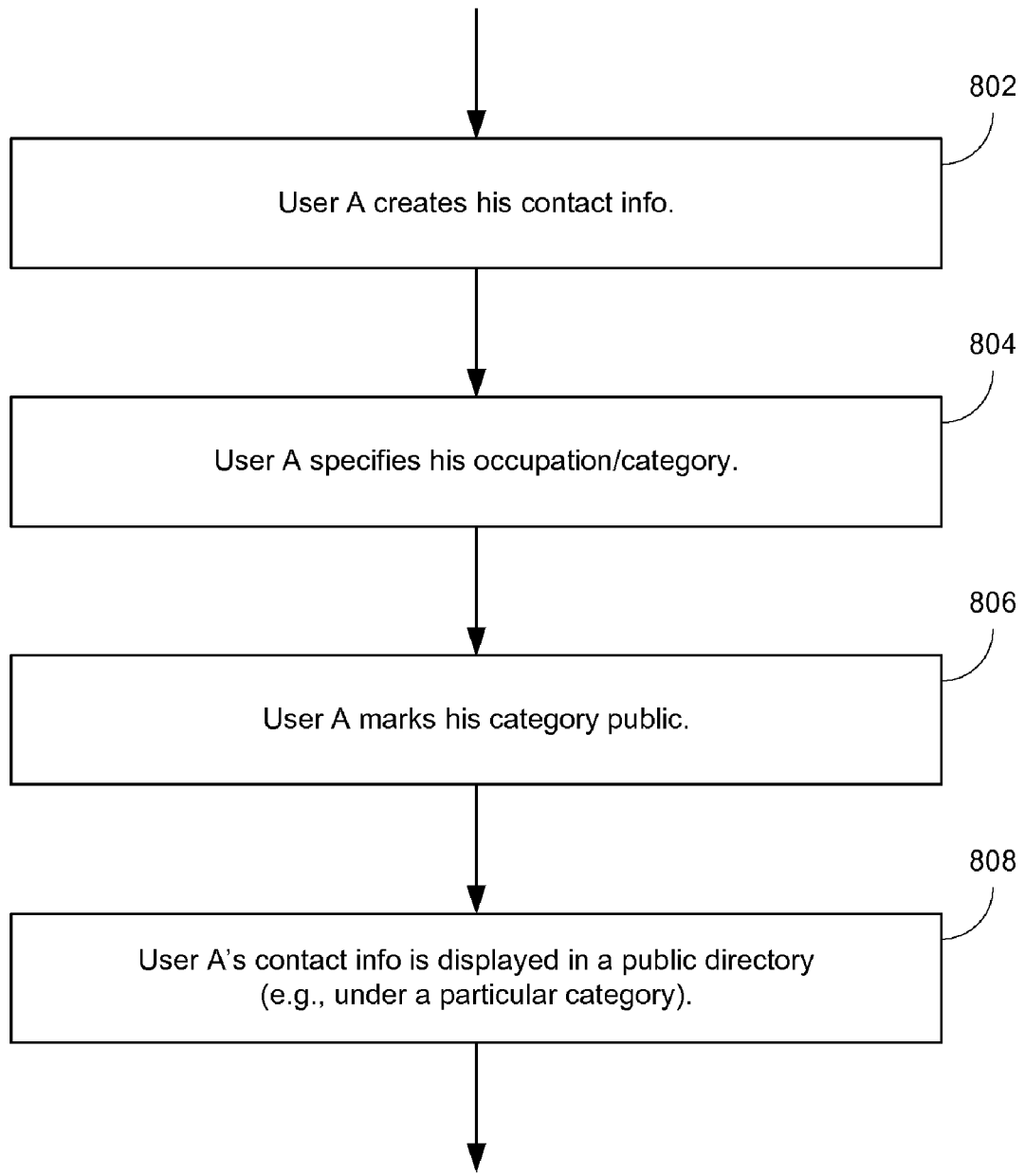
FIG. 16A illustrates an exemplary use case according to an embodiment of the present invention.
Figure 16B:
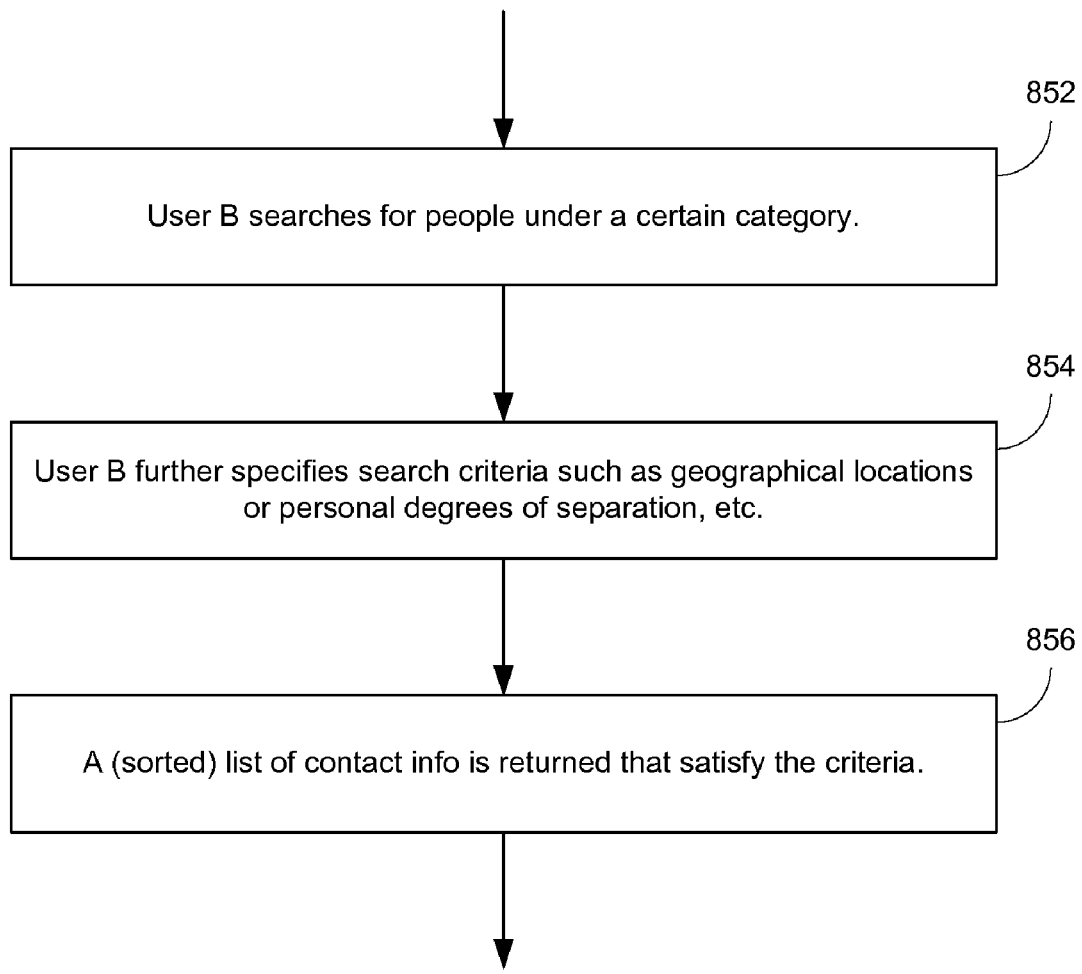
FIG. 16B illustrates another exemplary use case according to an embodiment of the present invention.

According to an embodiment of the present invention, a "directory service" may be provided based on user-created contact data. FIG. 16A illustrates an exemplary method according to an embodiment of the present invention. At block 802, user A creates his (public) contact entity on a system. User A specifies certain fields such as his occupation and industry he belongs to, etc., at 804. In a certain embodiment, the list of industries (or job titles, etc.) are pre-compiled and/or "standardized" so that a user can select a value from a predefined list, etc. The pre-selected industries may herein be called categories. If user A marks his contact entity viewable by other users (e.g., according to certain access control settings, etc.) at 806, his contact data will be listed in the public directory as indicated in block 810. When a user (with proper permission) search for certain contacts, user A's contact entity may be included if it matches the given search criteria. FIG. 16B is an exemplary use case according to an embodiment of the present invention illustrating a scenario for searching for contacts on a server(s). The exemplary process begins at 852 when user B searches for a contact(s), e.g., a person or business, etc. The search may be conducted using a user interface similar to that shown in FIG. 8. The user may be able to specify various search criteria such as degrees of separation and location, etc., as indication in block 854. The search result is then returned, if any, that satisfies the search criteria at 856.

According to an embodiment of the present invention, the following exemplary use case is supported. A user A registers on a system and he "uploads" his (and his contacts') business cards and contact information. This can be done in various ways. For example, the user's business card may be scanned (and OCR'ed, etc.) and contact data is created. When a contact data is generated (e.g., based on the scanned data), the user may be given a chance to modify the automatically generated data. The user may be prompted to add any additional data at that point (e.g., contact info that is not included in the business card, etc.). The user may give out the reference (e.g., id, etc.) to his contact entity to his colleagues or other people, say, person B. The person who receives the contact reference of the user A visits a Web site and inputs the reference or the identifier. In some embodiments, the person needs to be a registered user to be able to user the service. In some other embodiments, anybody with a existing user's contact entity identifier can access (a certain portion of) the user's contact info. When the business card or other token is directly used, the person B may be given a chance to select a particular user or contact entity based on the similarity metric (e.g., as long as she has a proper permission to see those contact data, etc.). User A may alter the access control levels of his contact entity at some point. For example, he may configure his contact entity to be visible by up to two degrees of separation, that is, it is viewable by people with direct contact relationship and the system users who are in direct contact relationship with those people. The user A's contact entity may also be listed on a system-wide directory or registry depending on the settings, e.g., based on his job title, industry, etc. According to a certain embodiment of the present invention, contact entities may be "tagged" or bookmarked by the users on the system. (Tags may be shareable among different users in some implementations.) A user can maintain a personal address book by selecting public contact entities and/or creating private contact entities. The list of contact entities may be exported in certain predefined formats, which may be imported to other contact management systems (e.g., a PDA-based PIM, Outlook address book, Web-based contact list server, etc.). In some embodiments, a central naming service is used to manage unique identifiers (e.g., of business cards, contact entities, etc.) across multiple contact management systems based on certain embodiments of the present invention. Business cards or contacts may be searched "on the Web" using one or more these contact management systems (e.g., using unique identifiers, or other attributes, etc.).

Thus, methods, systems, and apparatuses for storing, retrieving, and sharing contact information on a computer network have been provided. While the above description contains many specificities, these should not be construed as limitations on the scope of the invention, but as exemplifications of the presently preferred embodiments thereof. Many other ramifications and variations are possible within the teachings of the invention. As will be appreciated by one of skill in the art, the present invention may be embodied as a method, data processing system or program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable storage medium may be utilized including hard disks, CD-ROMs, DVD-ROMs, optical storage devices, or magnetic storage devices. Thus the scope of the invention should be determined by the appended claims and their legal equivalents, and not by the examples given.

What is claimed is:

1. A method for managing contact data for a plurality of users, the method to be implemented on a data processing system, the method comprising:
   maintaining a database of contact information, said database comprising a plurality of contact entities, said plurality of contact entities comprising a plurality of public contact entities and a plurality of private contact entities, said plurality of public contact entities comprising a first public contact entity and a second public contact entity, said first public contact entity being distinct from said second public contact entity, said plurality of private contact entities comprising a first private contact entity, wherein said first public contact entity is associated with a first unique identifier on the data processing system, wherein said second public contact entity is associated with a second unique identifier on the data processing system, said first unique identifier being different from said second unique identifier, and wherein said database further comprising a plurality of contact lists, each public contact entity from said plurality of public contact entities being included in at least one contact list from said plurality of contact lists, each private contact entity from said plurality of private contact entities being included in one and only one contact list from said plurality of contact lists;
   maintaining a list of users, said list including a first user and a second user, said first user being distinct from said second user, said first user being associated with a contact list from said plurality of contact lists, wherein said contact list includes said first public contact entity and said first private contact entity;
   receiving, from said first user, a request to add, to said contact list, contact data of said second user;
   searching, in said database, for at least one contact entity that comprises said contact data; and
   updating, based on said searching, said contact list, wherein said updating comprises, if said at least one contact entity is found in said database and if said at least one contact entity comprises said second public contact entity, adding said second public contact entity to said contact list, and wherein said updating comprises, if said at least one contact entity is not found in said database, creating a second private contact entity in said database and adding said second private contact entity to said contact list, wherein said second private contact entity comprises said contact data.

2. The method of claim 1, wherein:
   said first public contact entity comprises a contact data part and an additional data part, wherein said additional data part includes at least one of (a) shared comments, (b) personal annotations, or (c) ratings of said second user.

3. The method of claim 1, the method further comprising:
   second updating, in response to a request by said second user, one of (a) said second public contact entity or (b) said second private contact entity, if said second user has permission to modify said contact data.

4. The method of claim 3, wherein:
   said second updating comprises creating a new version of one of (a) said second public contact entity or (b) said second private contact entity.

5. The method of claim 1, wherein:
   said adding said second public contact entity to said contact list comprises associating a reference to said second public contact entity with said contact list.

6. The method of claim 1, the method further comprising:
   updating said second public contact entity to create an updated public contact entity, whereby the updated public contact entity is viewable by said first user.

7. The method of claim 1, the method further comprising:
   receiving, from said first user, a first request to update said first public contact entity, wherein said first public contact entity comprises first contact data of said first user;
   updating, in response to said receiving said first request, said first public contact entity; and
   enabling a third user from said list of users to access said first public contact entity, said third user being distinct from said first user.

8. The method of claim 1, the method further comprising:
   receiving, from said first user, a first request to create a new private contact entity, said first request comprising first contact data, said first contact data corresponding to a third user from said list of users, said third user being distinct from said first user;
   creating, in response to said receiving said first request, a third private contact entity in said database, said third private contact entity comprising said first contact data; and
   adding said third private contact entity to said contact list.

9. The method of claim 1, wherein:
   said list of users includes a third user, said third user being distinct from said first user, said third user being distinct from said second user, and wherein said first private contact entity comprises contact data of said third user.

10. The method of claim 1, wherein:
    each public contact entity from said plurality of public contact entities is associated with a category, and wherein said database is searchable based on categories.

11. The method of claim 1, wherein:
    said updating comprises, if said at least one contact entity is found in said database, said at least one contact entity comprising a third public contact entity, said at least one contact entity comprising a fourth public contact entity, said third public contact entity being distinct from said fourth public contact entity, (a) choosing, in response to a user input, a contact entity at least from said third public contact entity and said fourth public contact entity, and (b) adding the chosen contact entity to said contact list.

12. The method of claim 1, the method further comprising:
    receiving, from a third user in said list of users, a first request to view said first public contact entity, wherein said first request comprises data including said first unique identifier.

13. A data processing system for contact information management, the data processing system comprising:
    a processor; and
    a memory coupled with said processor, said memory having contained therein sequences of instructions which, when executed by said processor, cause said processor to perform a method for managing contact data for a plurality of users, the method comprising:
       maintaining a database of contact information, said database comprising a plurality of contact entities, said plurality of contact entities comprising a plurality of public contact entities and a plurality of private contact entities, said plurality of public contact entities comprising a first public contact entity and a second public contact entity, said first public contact entity being distinct from said second public contact entity, said plurality of private contact entities comprising a first private contact entity, wherein said first public contact entity is associated with a first unique identifier on the data processing system, wherein said second public contact entity is associated with a second unique identifier on the data processing system, said first unique identifier being different from said second unique identifier, and wherein said database further comprising a plurality of contact lists, each public contact entity from said plurality of public contact entities being included in at least one contact list from said plurality of contact lists, each private contact entity from said plurality of private contact entities being included in one and only one contact list from said plurality of contact lists;

maintaining a list of users, said list including a first user and a second user, said first user being distinct from said second user, said first user being associated with a contact list from said plurality of contact lists, wherein said contact list includes said first public contact entity and said first private contact entity;

receiving, from said first user, a request to add, to said contact list, contact data of said second user;

searching, in said database, for at least one contact entity that comprises said contact data; and updating, based on said searching, said contact list, wherein said updating comprises, if said at least one contact entity is found in said database and if said at least one contact entity comprises said second public contact entity, adding said second public contact entity to said contact list, and wherein said updating comprises, if said at least one contact entity is not found in said database, creating a second private contact entity in said database and adding said second private contact entity to said contact list, wherein said second private contact entity comprises said contact data.

14. The data processing system of claim 13, wherein:

said first public contact entity comprises a contact data part and an additional data part, wherein said additional data part includes at least one of (a) shared comments, (b) personal annotations, or (c) ratings of said second user.

15. The data processing system of claim 13, the method further comprising:

second updating, in response to a request by said second user, one of (a) said second public contact entity or (b) said second private contact entity, if said second user has permission to modify said contact data.

16. The data processing system of claim 15, wherein:

said second updating comprises creating a new version of one of (a) said second public contact entity or (b) said second private contact entity.

17. The data processing system of claim 13, wherein:

said adding said second public contact entity to said contact list comprises associating a reference to said second public contact entity with said contact list.

18. The data processing system of claim 13, the method further comprising:

updating said second public contact entity to create an updated public contact entity, whereby the updated public contact entity is viewable by said first user.

19. The data processing system of claim 13, the method further comprising:

receiving, from said first user, a first request to update said first public contact entity, wherein said first public contact entity comprises first contact data of said first user;

updating, in response to said receiving said first request, said first public contact entity; and enabling a third user from said list of users to access said first public contact entity, said third user being distinct from said first user.

20. The data processing system of claim 13, the method further comprising:

receiving, from said first user, a first request to create a new private contact entity, said first request comprising first contact data, said first contact data corresponding to a third user from said list of users, said third user being distinct from said first user;

creating, in response to said receiving said first request, a third private contact entity in said database, said third private contact entity comprising said first contact data; and adding said third private contact entity to said contact list.

* * * * *